United States Patent
Ohno et al.

(10) Patent No.: US 11,618,293 B2
(45) Date of Patent: Apr. 4, 2023

(54) ELECTRICALLY POWERED SUSPENSION SYSTEM INCLUDING AN ELECTROMAGNETIC ACTUATOR, INFORMATION ACQUIRER, AND DRIVE FORCE ARITHMETIC PART

(71) Applicant: HONDA MOTOR CO., LTD., Tokyo (JP)

(72) Inventors: Satoshi Ohno, Wako (JP); Takafumi Kato, Wako (JP); Tomoya Toyohira, Wako (JP); Atsuhiko Yoneda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 443 days.

(21) Appl. No.: 16/830,525

(22) Filed: Mar. 26, 2020

(65) Prior Publication Data

US 2020/0307338 A1     Oct. 1, 2020

(30) Foreign Application Priority Data

Mar. 27, 2019   (JP) .............................. JP2019-061139

(51) Int. Cl.
*B60G 17/018*     (2006.01)
*B60G 17/06*      (2006.01)
(Continued)

(52) U.S. Cl.
CPC ....... *B60G 17/018* (2013.01); *B60G 17/0157* (2013.01); *B60G 17/0165* (2013.01);
(Continued)

(58) Field of Classification Search
CPC .............. B60G 17/018; B60G 17/0157; B60G 17/0165; B60G 17/06; B60G 17/0162;
(Continued)

(56) References Cited

U.S. PATENT DOCUMENTS

2018/0065438 A1\*   3/2018   Ogawa ............... B60G 17/0157
2018/0134111 A1    5/2018   Toyohira et al.
(Continued)

FOREIGN PATENT DOCUMENTS

JP     2017-165282 A    9/2017
JP       6417443 B1    11/2018
(Continued)

OTHER PUBLICATIONS

Office Action received in corresponding Japanese application No. 2019-061139 dated Oct. 27, 2020 with English translation (6 pages).

*Primary Examiner* — Geepy Pe
*Assistant Examiner* — Sean Patrick Reidy
(74) *Attorney, Agent, or Firm* — Rankin, Hill & Clark LLP

(57) ABSTRACT

Included are an electromagnetic actuator which includes an electric motor configured to generate drive forces for a damping operation and a telescopic operation; an information acquirer which acquires a stroke velocity of the electromagnetic actuator; a drive force arithmetic part which includes a damping force calculator configured to calculate a target damping force and a telescopic force calculator configured to calculate a target telescopic force, and which obtains a target drive force based on the target damping force and the target telescopic force; and a drive controller which controls drive of the electric motor using the target drive force. The drive force arithmetic part includes an adjuster which performs an adjustment to reduce a telescopic control amount for the target telescopic force based on the stroke velocity acquired by the information acquirer.

5 Claims, 12 Drawing Sheets

(51) Int. Cl.
*B60G 17/015* (2006.01)
*B60G 17/0165* (2006.01)

(52) U.S. Cl.
CPC .......... *B60G 17/06* (2013.01); *B60G 2400/20* (2013.01); *B60G 2500/10* (2013.01); *B60G 2600/182* (2013.01); *B60G 2600/26* (2013.01); *B60G 2800/162* (2013.01)

(58) Field of Classification Search
CPC ............ B60G 2202/42; B60G 2400/20; B60G 2400/0523; B60G 2400/102; B60G 2400/204; B60G 2400/30; B60G 2500/10; B60G 2600/182; B60G 2600/26; B60G 2800/162
USPC .......................................................... 701/37
See application file for complete search history.

(56) References Cited

U.S. PATENT DOCUMENTS

| | | |
|---|---|---|
| 2018/0297434 A1 | 10/2018 | Ohno et al. |
| 2018/0361813 A1 | 12/2018 | Ohno et al. |
| 2018/0361814 A1 | 12/2018 | Ohno et al. |
| 2018/0361816 A1 | 12/2018 | Ohno et al. |
| 2019/0023095 A1* | 1/2019 | Ficca ................. B60W 30/025 |
| 2019/0255903 A1* | 8/2019 | Hirao .................. B60G 17/018 |
| 2020/0062068 A1* | 2/2020 | Trangbaek ............. B60G 17/06 |

FOREIGN PATENT DOCUMENTS

| | | |
|---|---|---|
| JP | 2019-001368 A | 1/2019 |
| JP | 2019-001369 A | 1/2019 |
| JP | 2019-001370 A | 1/2019 |

\* cited by examiner

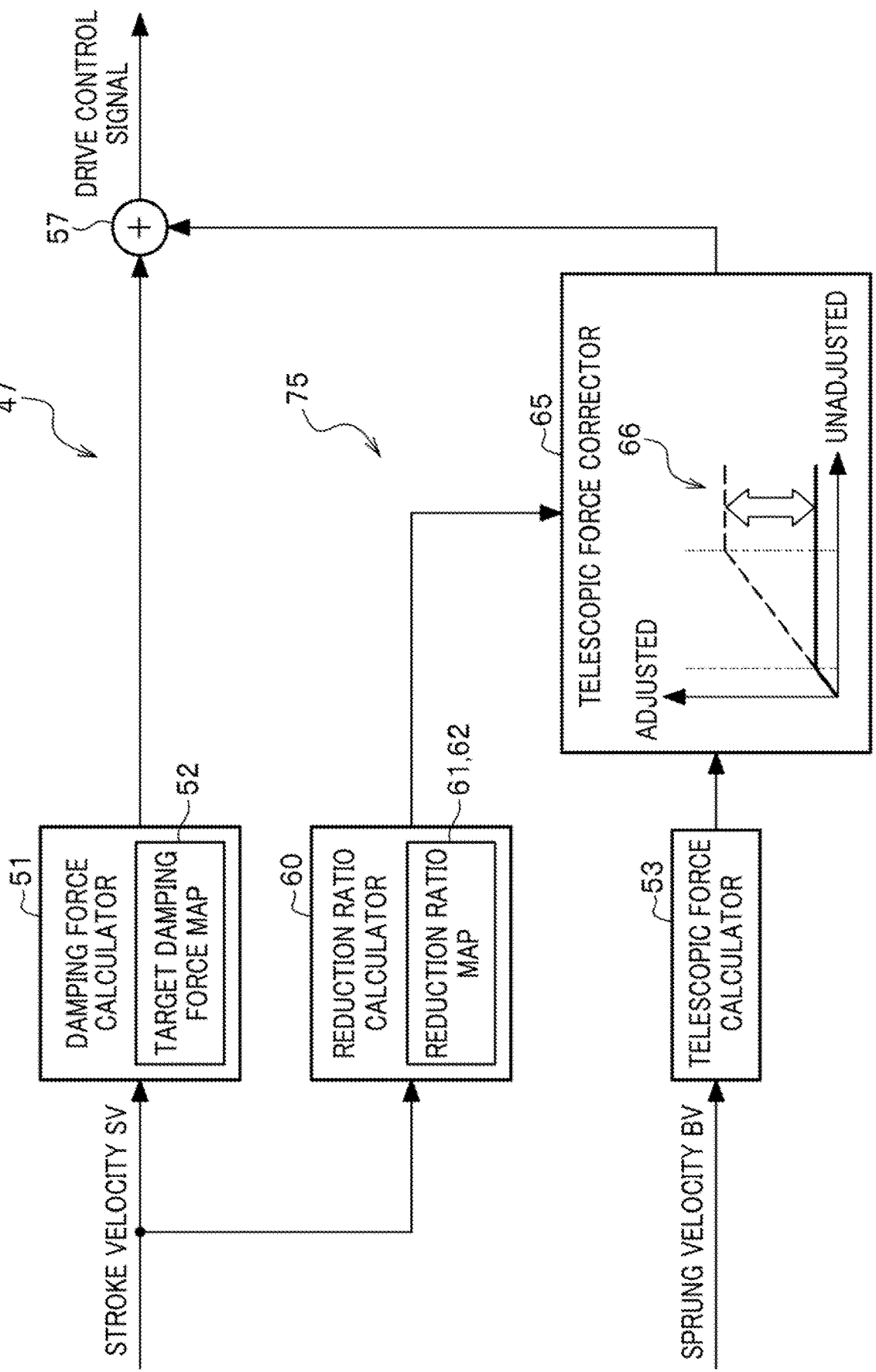

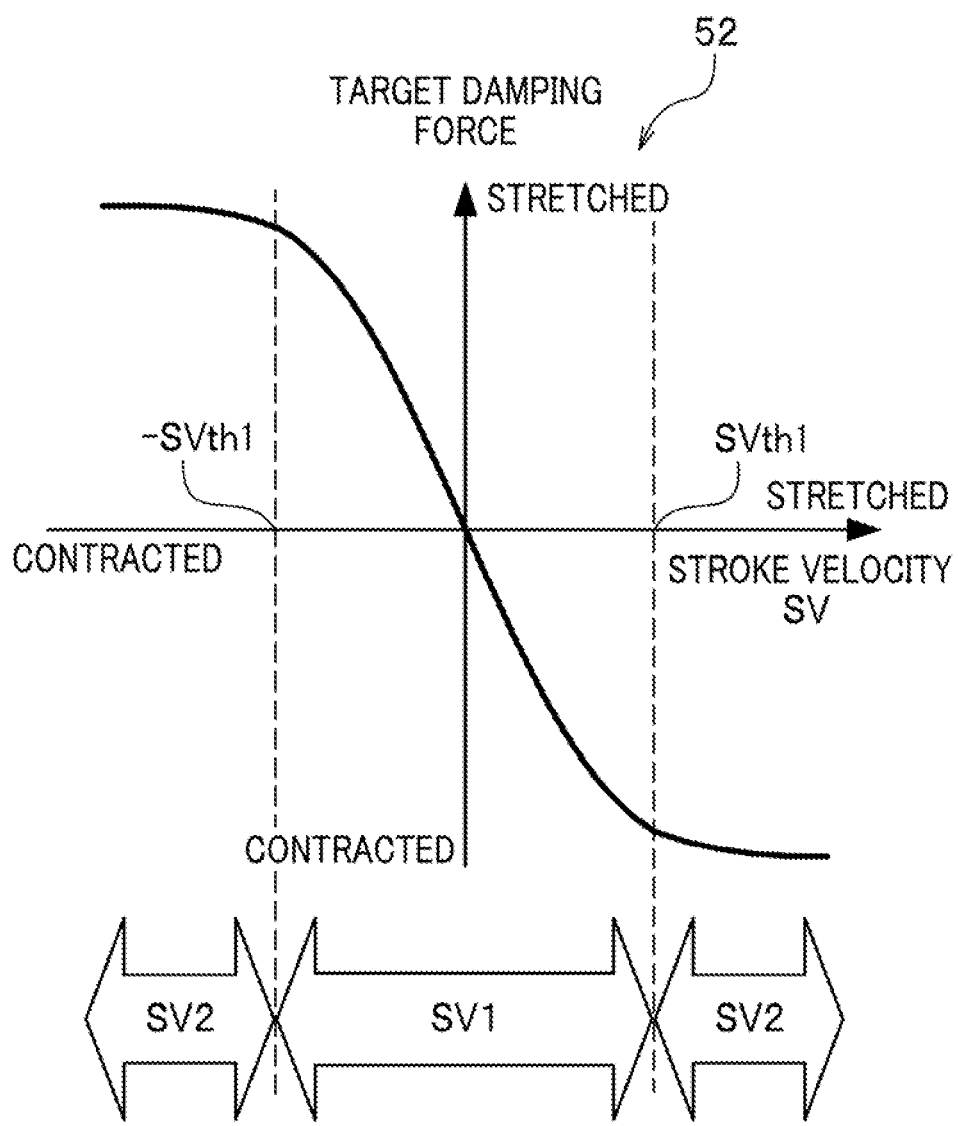

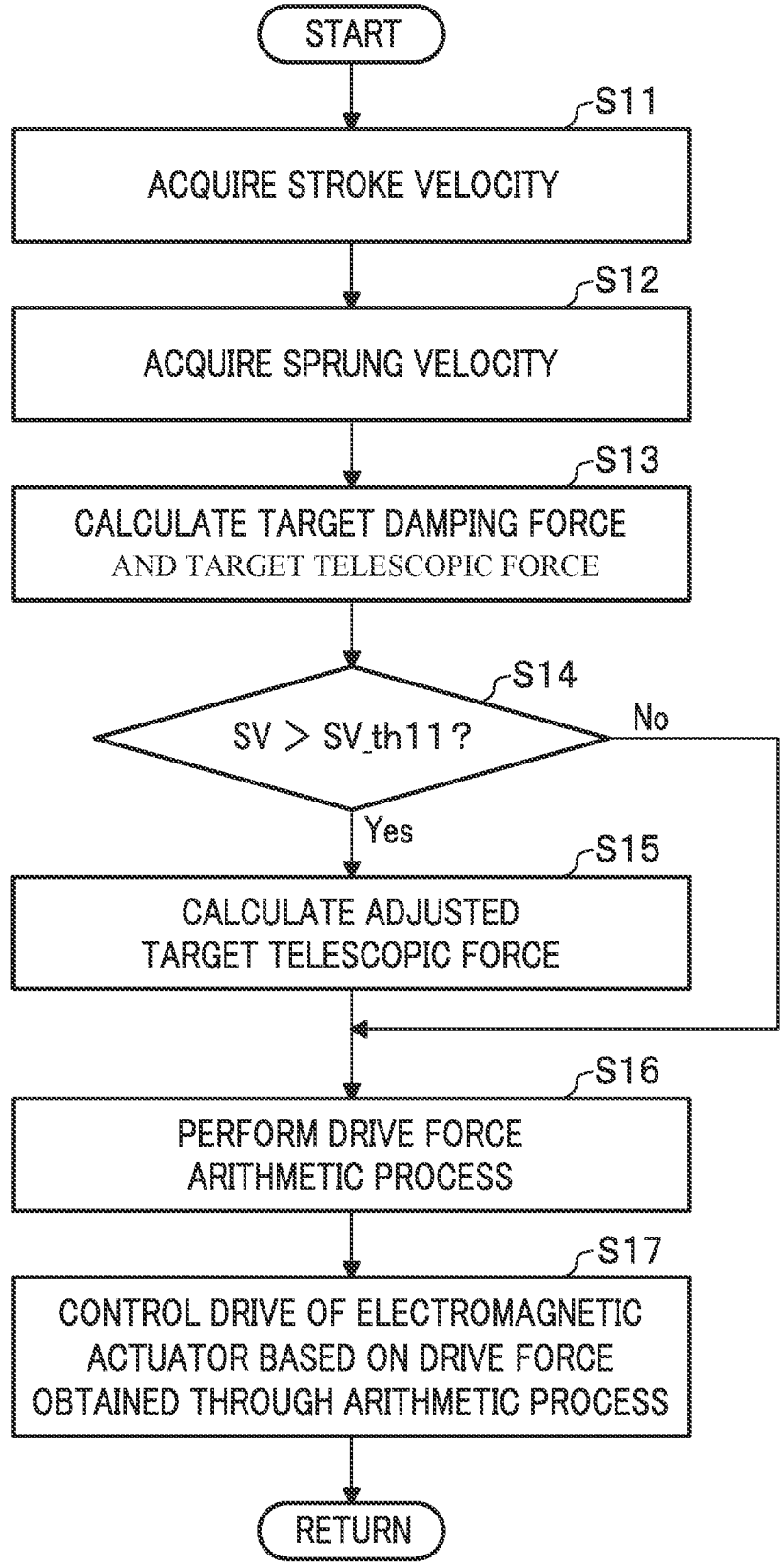

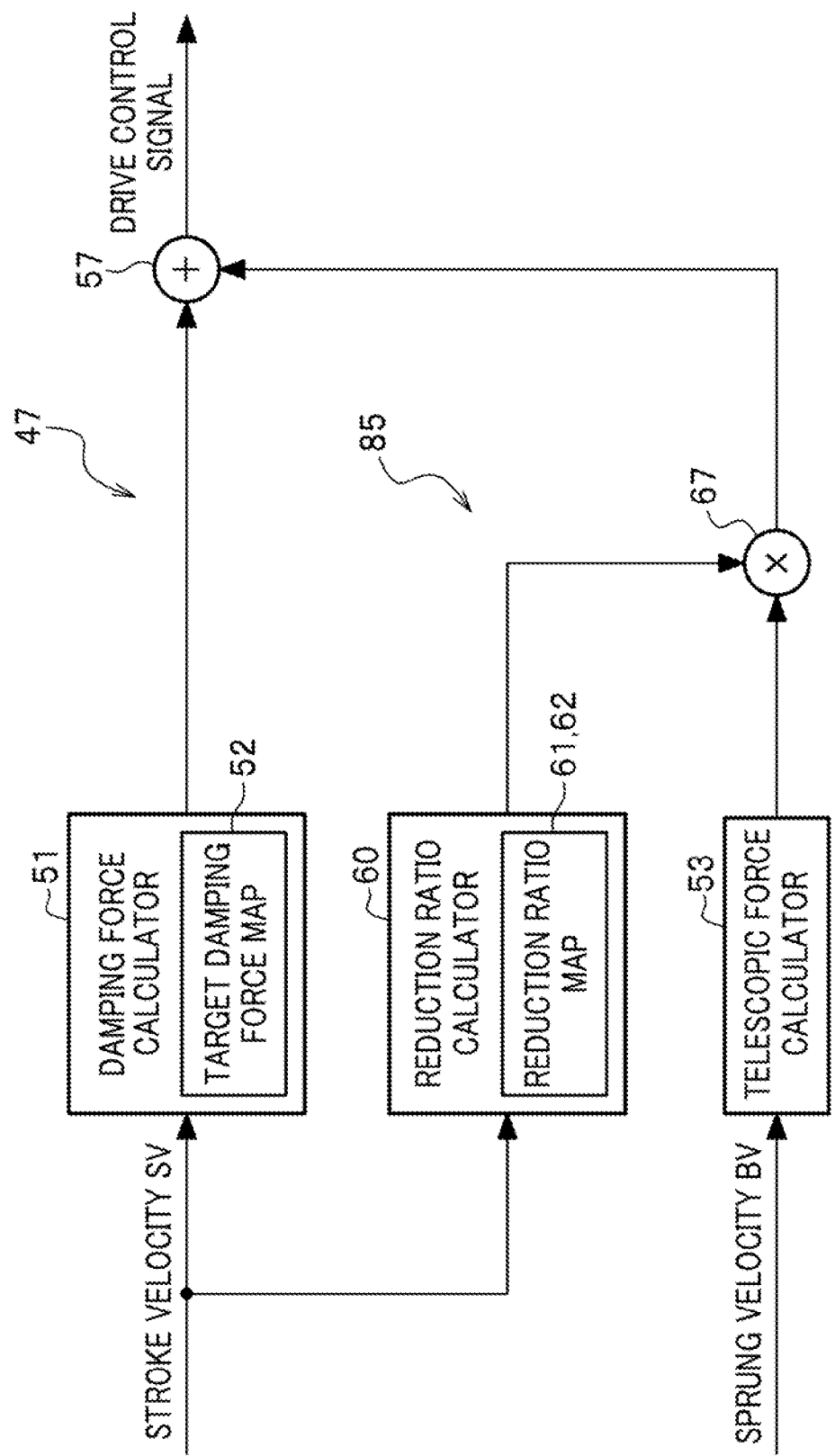

ELECTRICALLY POWERED SUSPENSION SYSTEM INCLUDING AN ELECTROMAGNETIC ACTUATOR, INFORMATION ACQUIRER, AND DRIVE FORCE ARITHMETIC PART

CROSS-REFERENCE TO RELATED APPLICATION

This application is based upon and claims priority from the Japanese Patent Application No. 2019-61139, filed on Mar. 27, 2019, the entire contents of which are incorporated herein by reference.

BACKGROUND OF THE INVENTION

1. Field of the Invention

The present invention relates to an electrically powered suspension system which includes an electromagnetic actuator provided between a vehicle body and a wheel of a vehicle, and including an electric motor configured to generate drive forces for a damping operation and a telescopic operation.

2. Description of the Related Art

An electrically powered suspension system has been known which includes an electromagnetic actuator provided between a vehicle body and a wheel of a vehicle, and including an electric motor configured to generate drive forces for a damping operation and a telescopic operation (see Japanese Patent No. 6417443, hereinafter referred to as "Patent Document 1"). The electromagnetic actuator includes a ball screw mechanism in addition to the electric motor. The electromagnetic actuator converts the rotary motion of the electric motor into the linear motion of the ball screw mechanism. Thus, the electric motor operates to generate the drive forces for the damping operation and the telescopic operation.

In this respect, the drive force for the damping operation means a damping force. The damping force is a force which works in a direction opposite to a direction of a stroke velocity of the electromagnetic actuator. Meanwhile, the drive force for the telescopic operation means a telescopic force. The telescopic force is a force which works in a direction which has nothing to do with the direction of the stroke velocity.

SUMMARY OF THE INVENTION

The electrically powered suspension system disclosed in Patent Document 1, meanwhile, is likely to cause a situation where in a case of application of a large input for example when a wheel gets onto a step, the electric motor included in the electromagnetic actuator operates near its output capacity limit. Specifically, in such a case, the electrically powered suspension system makes the electric motor integrally generate a damping force for alleviating a phenomenon which thrusts up the vehicle body when the large input is applied to the vehicle body and a telescopic force which keeps the orientation of the vehicle in a horizontal condition.

However, in a case where the electric motor operates near its output capacity limit, there is a problem of how to allocate the maximum output (maximum drive force) of the electric motor between the damping force and the telescopic force.

If sufficiently large damping force cannot be secured, vibration of an unsprung member (a wheel) cannot be suppressed sufficiently. This likely disturbs the behavior of the vehicle. Meanwhile, if sufficiently large telescopic force cannot be secured, the vehicle cannot be held in a stable orientation based on skyhook control. This likely impairs ride quality performance of the vehicle.

In this respect, Patent Document 1 does not discuss how to allocate the maximum drive force of the electric motor between the damping force and the telescopic force in the case where the electric motor operates near its output capacity limit.

The present invention has been made with the above situation taken into consideration. An object of the present invention is to provide an electrically powered suspension system which is capable of achieving the control of the vibration of the vehicle without disturbing the behavior of the vehicle or impairing the ride quality performance of the vehicle as much as possible even in the case where the electric motor operates near its output capacity limit.

For the purpose of achieving the above object, the present invention has a major feature as follows. The invention includes: an electromagnetic actuator which is provided between a vehicle body and a wheel of a vehicle, and which includes an electric motor configured to generate drive forces for a damping operation and a telescopic operation; an information acquirer which acquires information about a stroke velocity of the electromagnetic actuator; a drive force arithmetic part which includes a damping force calculator configured to calculate a target damping force serving as a target value of the damping operation of the electromagnetic actuator, and a telescopic force calculator configured to calculate a target telescopic force serving as a target value of the telescopic operation of the electromagnetic actuator, and which obtains a target drive force based on the target damping force calculated by the damping force calculator and the target telescopic force calculated by the telescopic force calculator; and a drive controller which controls drive of the electric motor using the target drive force obtained by the drive force arithmetic part, wherein the drive force arithmetic part includes an adjuster which performs an adjustment to reduce a telescopic control amount for the target telescopic force based on the stroke velocity acquired by the information acquirer.

The present invention can achieve the control of the vibration of the vehicle without disturbing the behavior of the vehicle or impairing the ride quality performance of the vehicle even in the case where the electric motor operates near its output capacity limit.

BRIEF DESCRIPTION OF THE DRAWINGS

FIG. 4A is a diagram conceptually illustrating an internal portion of the ECU included in the electric suspension according to the first embodiment of the present invention.

FIG. 4B is an explanatory diagram of a damping force map which conceptually shows a relationship between a stroke velocity and a target damping force which changes corresponding to the stroke velocity.

FIG. 5 is a flowchart diagram which is used to explain how the electrically powered suspension system according to the first embodiment of the present invention works.

FIG. 7 is a diagram conceptually illustrating an internal portion of an ECU included in the electrically powered suspension system according to a modification of the first embodiment of the present invention.

DETAILED DESCRIPTION OF THE EMBODIMENTS

An electrically powered suspension system according to first and second embodiments of the present invention will be hereinafter described in detail with reference to the accompanying drawings depending on the necessity.

It should be noted that in the following diagrams, members having common functions will be denoted by common reference signs. In addition, sizes and shapes of members are schematically illustrated with deformation or exaggeration for the sake of explanatory convenience.

[A Basic Configuration Common Among of Electrically Powered Suspension Systems 11 According to First and Second Embodiments of the Present Invention]

Figure 1:
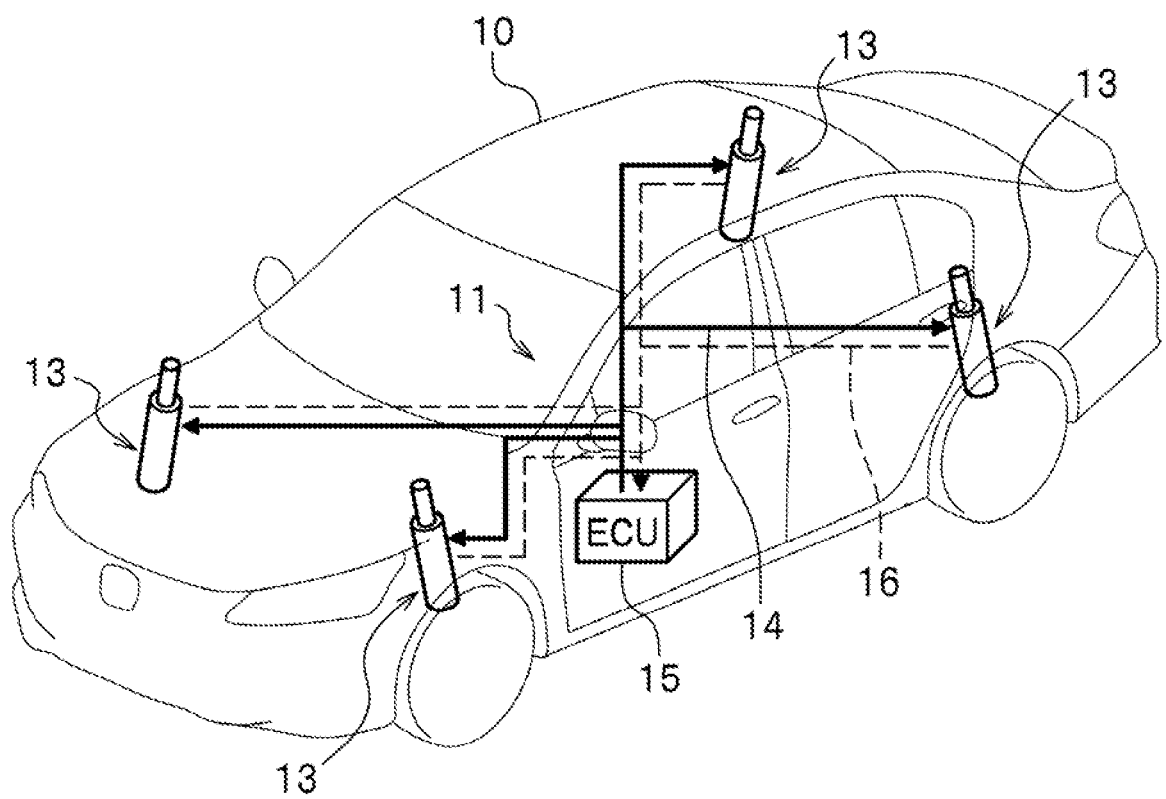
FIG. 1 is an overall configuration diagram of an electrically powered suspension system according to first and second embodiments of the present invention.
Figure 2:
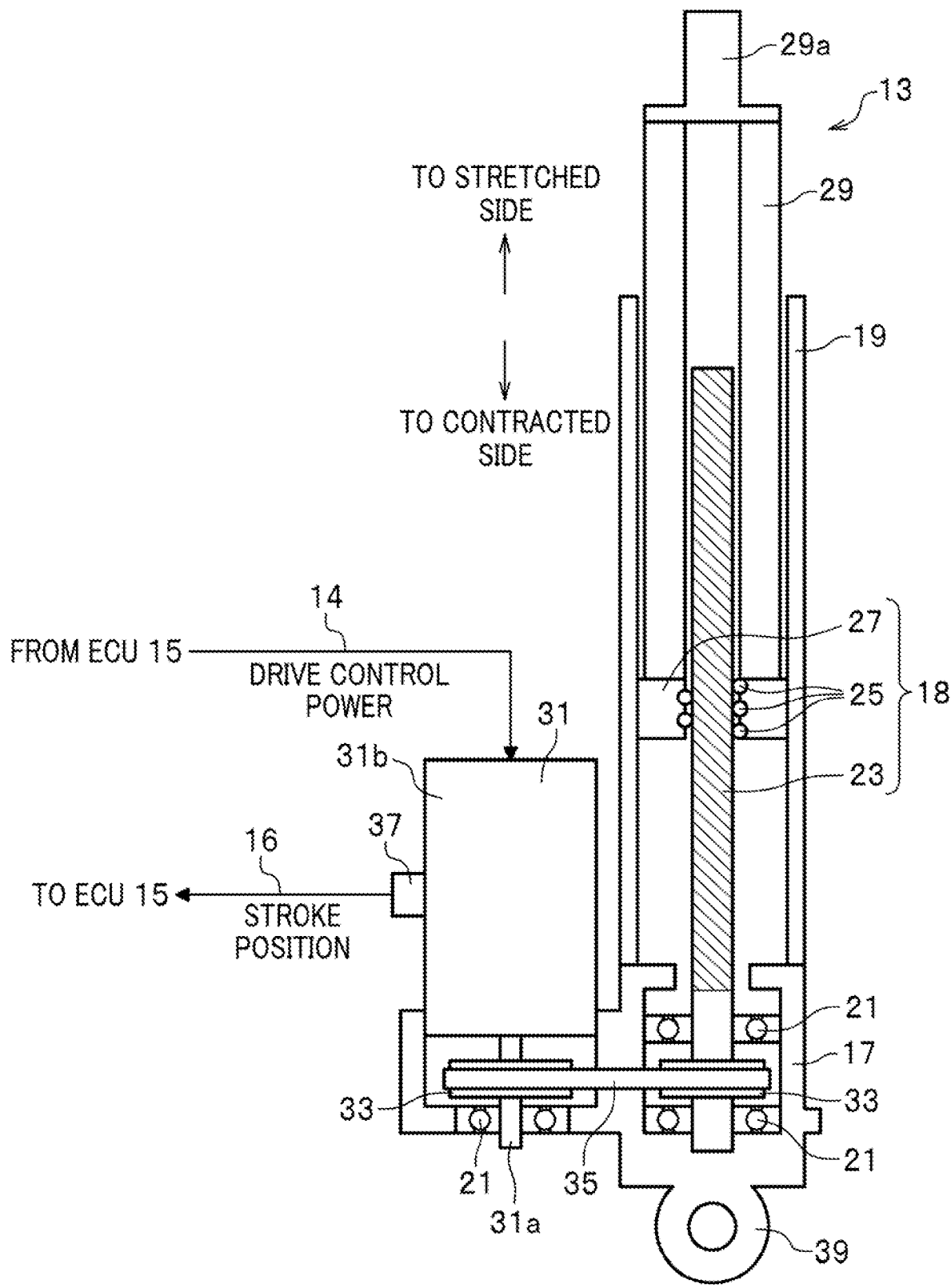
FIG. 2 is a partial cross-sectional diagram of an electromagnetic actuator included in the electrically powered suspension system.

To begin with, referring to FIGS. 1 and 2, descriptions will be provided for the basic configuration common among the electrically powered suspension systems 11 according to first and second embodiments of the present invention.

FIG. 1 is a diagram of the overall configuration common among the electrically powered suspension systems 11 according to the first and second embodiments of the present invention. FIG. 2 is a partial cross-sectional diagram of an electromagnetic actuator 13 constituting a part of each electrically powered suspension systems 11. Incidentally, in the following descriptions, the electrically powered suspension systems 11 according to the first and second embodiments of the present invention will be generically referred to as an "electrically powered suspension system 11 of the embodiment of the present invention."

As illustrated in FIG. 1, the electrically powered suspension system 11 according to each embodiment of the present invention includes: multiple electromagnetic actuators 13 provided to the respective wheels of a vehicle 10; and a single electronic control unit (hereinafter referred to as an "ECU") 15. The multiple electromagnetic actuators 13 and the ECU 15 are connected to one another with: electric power supply lines 14 (see solid lines in FIG. 1) which supply drive control power from the ECU 15 to the multiple electromagnetic actuators 13; and signal lines 16 (see broken lines in FIG. 1) which send rotation angle signals of electric motors 31 (see FIG. 2) from the multiple electromagnetic actuators 13 to the ECU 15, respectively.

In the embodiment, four electromagnetic actuators 13 in total are provided to the respective wheels: including front wheels (a left front wheel and a right front wheel); and rear wheels (a left rear wheel and a right rear wheel). Drives of the electromagnetic actuators 13 provided to the wheels are controlled independently of one another in response to the telescopic operations of the wheels, respectively.

In the embodiment of the present invention, the multiple electromagnetic actuators 13 include a common configuration unless otherwise indicated specifically. Descriptions of the multiple electromagnetic actuators 13, therefore, will be provided by describing the configuration of one electromagnetic actuator 13.

As illustrated in FIG. 2, the electromagnetic actuator 13 includes a base housing 17, an outer tube 19, ball bearings 21, a ball screw shaft 23, multiple balls 25, a nut 27 and an inner tube 29.

The base housing 17 supports a base end side of the ball screw shaft 23 with the ball bearings 21 in between in a way that enables the ball screw shaft 23 to rotate about its axis. The outer tube 19 is provided to the base housing 17, and contains a ball screw mechanism 18 including the ball screw shaft 23, the multiple balls 25 and the nut 27. The multiple balls 25 roll along a screw groove in the ball screw shaft 23. The nut 27 engages with the ball screw shaft 23 with the multiple balls 25 in between, and converts the rotational motion to the linear motion of the ball screw shaft 23. The inner tube 29 linked to the nut 27 displaces integrally with the nut 27 in an axial direction of the outer tube 19.

As illustrated in FIG. 2, for the purpose of transmitting a rotary drive force to the ball screw shaft 23, the electromagnetic actuator 13 includes an electric motor 31, a pair of pulleys 33 and a belt member 35. The electric motor 31 is provided to the base housing 17 in parallel to the outer tube 19. The pulleys 33 are respectively attached to a motor shaft 31a of the electric motor 31 and the ball screw shaft 23. The belt member 35 which transmits the rotary drive force of the electric motor 31 to the ball screw shaft 23 is suspended between the pair of pulleys 33.

The electric motor 31 is provided with a resolver 37 which detects the rotation angle signal of the electric motor 31. The rotation angle signal of the electric motor 31 which is detected by the resolver 37 is sent to the ECU 15 through the signal line 16. The rotary drive of the electric motor 31 is controlled in response to the drive control power which the ECU 15 supplies to a corresponding one of the multiple electromagnetic actuators 13 through a corresponding one of the electric power supply lines 14.

It should be noted that in the embodiment, the axial-direction dimension of the of the electromagnetic actuator 13 is made shorter than otherwise by employing a layout in which the motor shaft 31a of the electric motor 31 and the ball screw shaft 23 are linked together by being arranged substantially in parallel with each other, as illustrated in FIG. 2. A layout, however, may be employed in which the motor shaft 31a of the electric motor 31 and the ball screw shaft 23 are linked together by being arranged coaxially.

In the electromagnetic actuator 13 according to the embodiment, a link part 39 is provided to a lower end portion of the base housing 17, as illustrated in FIG. 2. The link part 39 is linked and fixed to a spring lower member (a wheel-side lower arm, knuckle or the like), although not illustrated. Meanwhile, an upper end part 29a of the inner tube 29 is linked and fixed to a sprung member (a vehicle body-side strut tower part or the like), although not illustrated.

In short, the electromagnetic actuator 13 is installed in parallel with the spring member provided between the vehicle body and the wheel of the vehicle 10, although not illustrated. The sprung member is provided with a sprung acceleration sensor 40 (see FIG. 3) which detects the (sprung) acceleration of the vehicle body in a stroke direction of the electromagnetic actuator 13.

The above-configured electromagnetic actuator 13 works as follows. Let us consider, for example, a case where a thrust related to upward vibration is inputted from the wheel side of the vehicle 10 into the link part 39. In this case, the inner tube 29 and the nut 27 are going to integrally descend relative to the outer tube 19 to which the thrust related to the upward vibration is applied. Thus, the ball screw shaft 23 is going to rotate in a direction corresponding to the descent of the nut 27. At this moment, the electric motor 31 generates the rotary drive force in a direction in which the rotary drive force obstructs the descent of the nut 27. The rotary drive force of the electric motor 31 is transmitted to the ball screw shaft 23 through the belt member 35.

In this way, the reaction force (damping force) against the thrust related to the upward vibration works on the ball screw shaft 23. This damps the damping force which is going to be transmitted from the wheel side to the vehicle body side.

[An Internal Configuration of the ECU 15]

Next, referring to FIGS. 3 and 4A to 4E, descriptions will be provided for an interior portion and a peripheral portion of the ECU 15 included in the electrically powered suspension system 11 according to the embodiment of the present invention.

Figure 3:
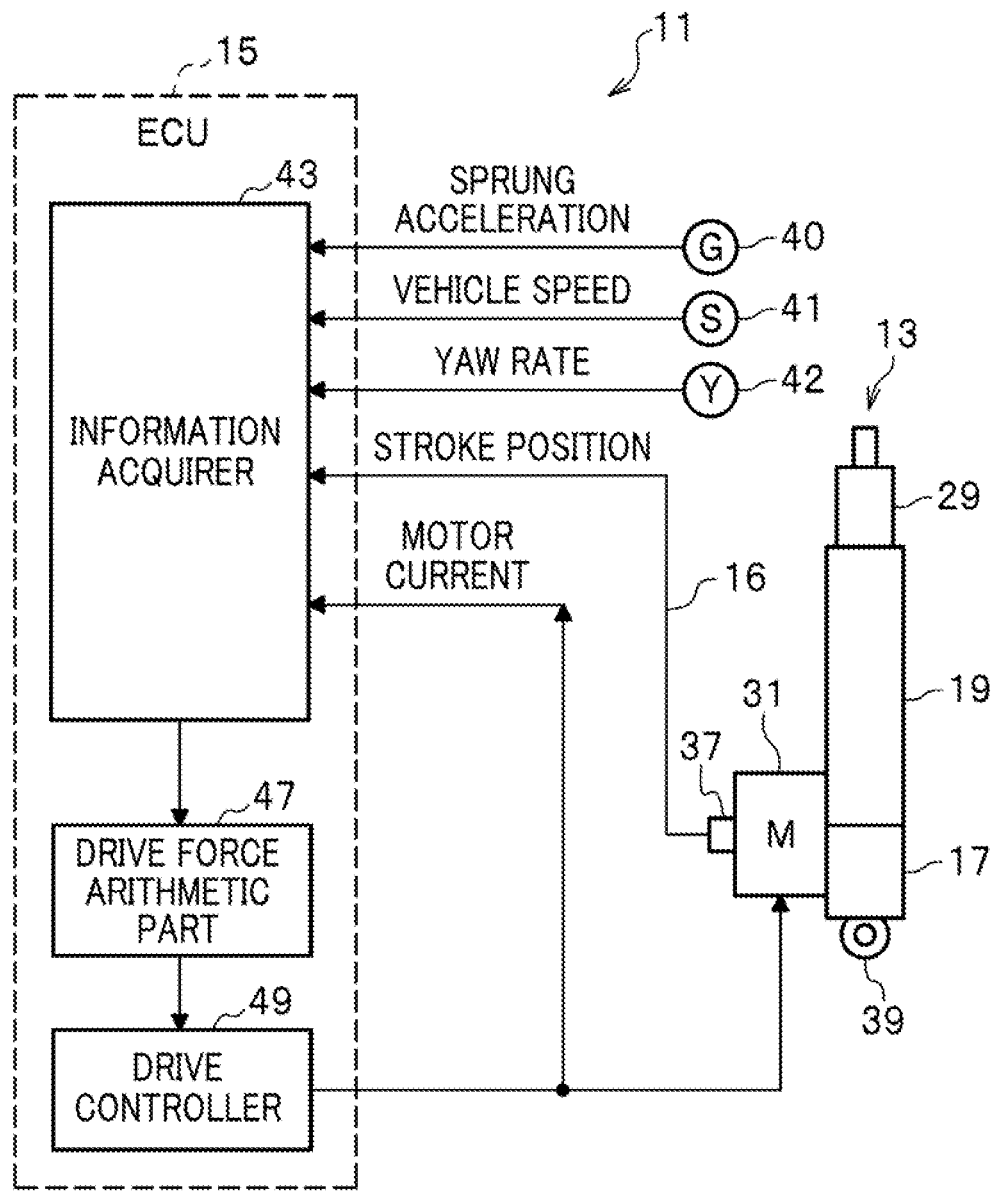
FIG. 3 is a configuration diagram of an interior portion and a peripheral portion of an ECU included in the electrically powered suspension system.
Figure 4C:
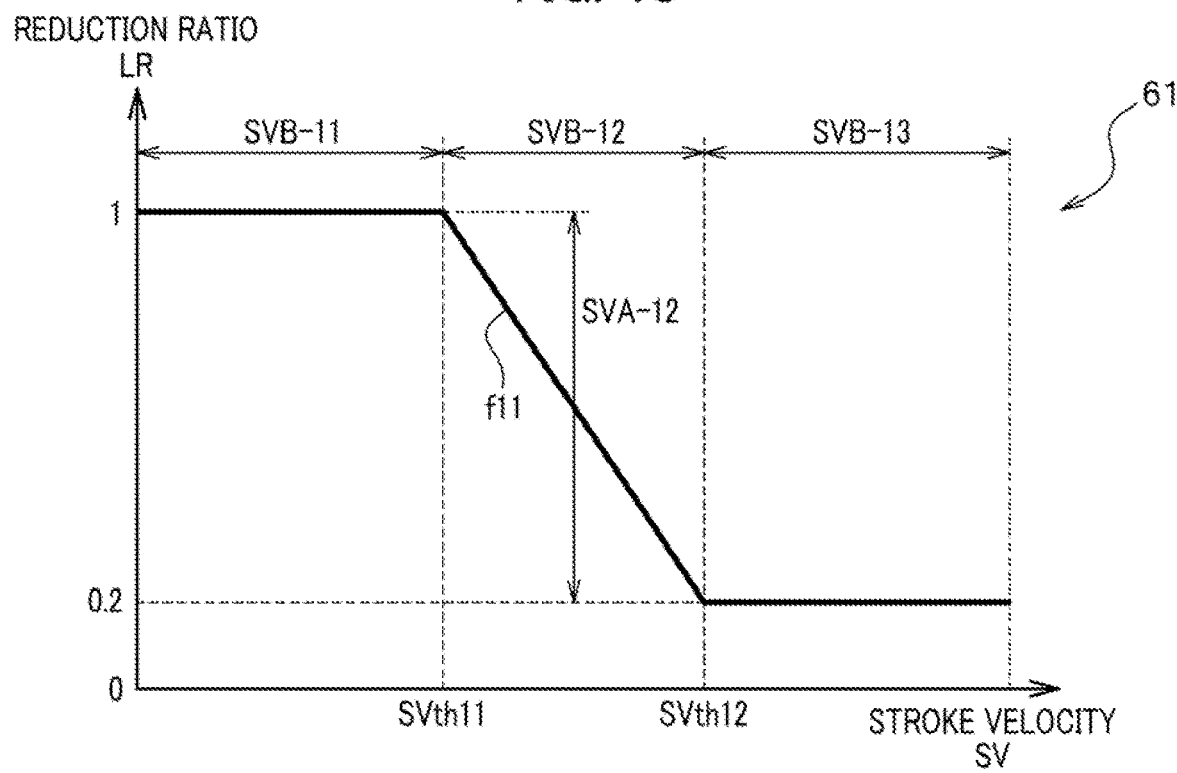
FIG. 4C is an explanatory diagram of a first reduction ratio map which conceptually shows a relationship between the stroke velocity and a reduction ratio which changes corresponding to the stroke velocity.
Figure 4D:
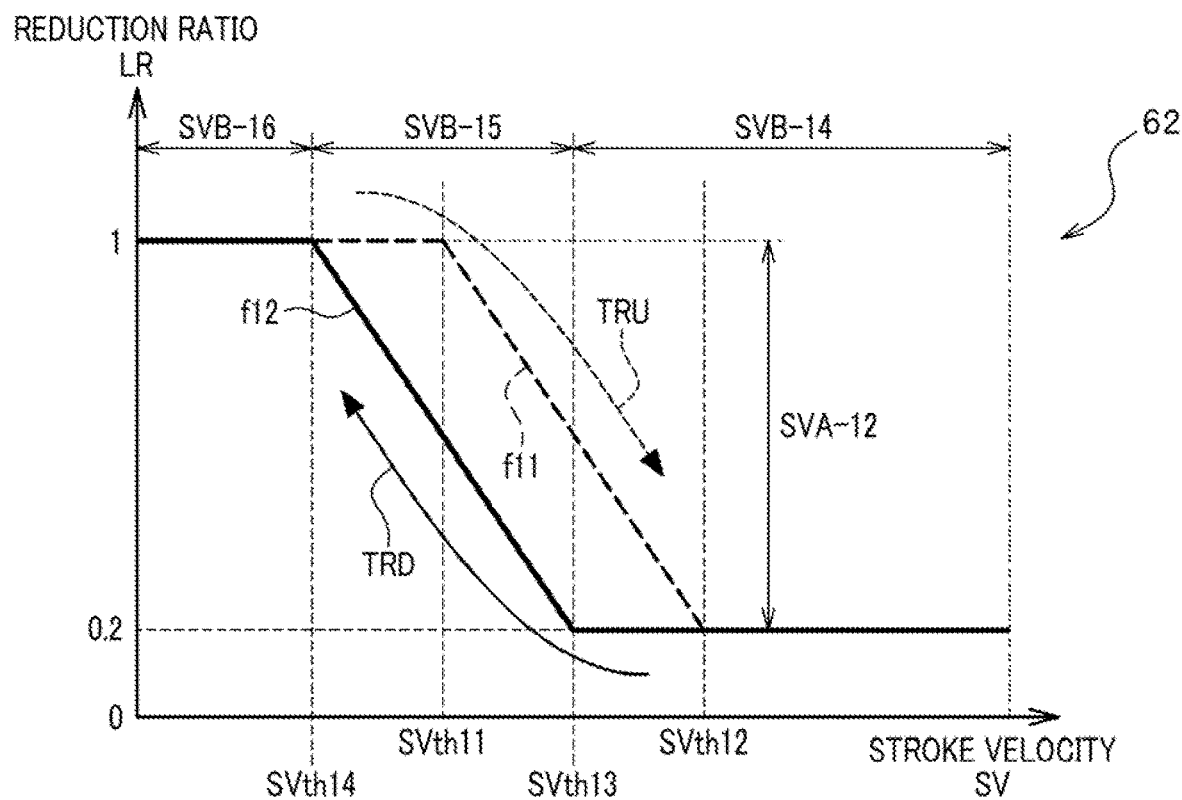
FIG. 4D is an explanatory diagram of a second reduction ratio map which conceptually shows how a characteristic value of the reduction ratio which changes corresponding to the stroke velocity follows a hysteresis track between an increase and a decrease in the stroke velocity.
Figure 4E:
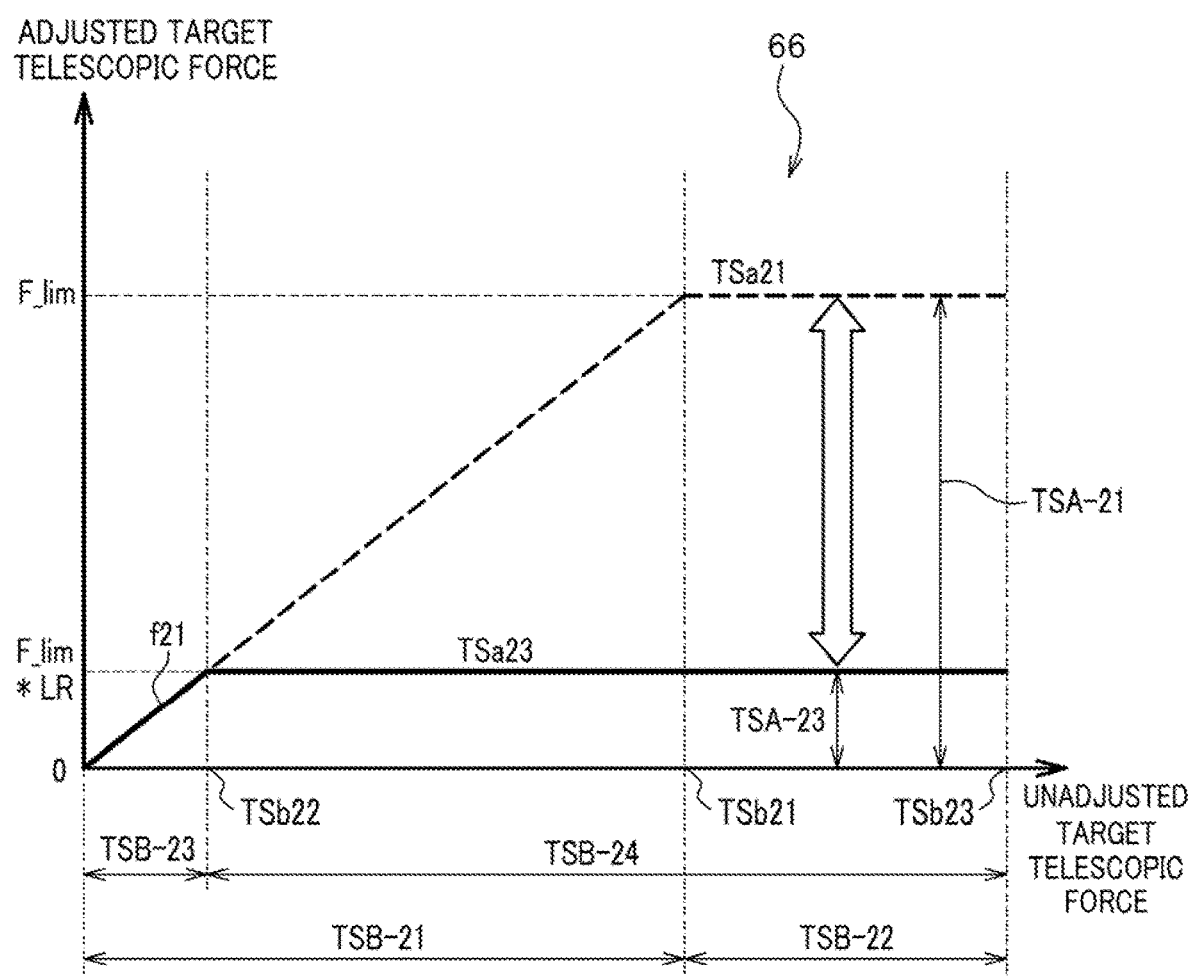
FIG. 4E is an explanatory diagram of an unadjusted and adjusted target telescopic force map which conceptually shows a relationship between an unadjusted target telescopic force and an adjusted target telescopic force in response to occurrence of an adjustment request for a reduction in a telescopic control amount.

FIG. 3 is a configuration diagram of the interior portion and the peripheral portion of the ECU 15 included in the electrically powered suspension system 11 according to the embodiment of the present invention. FIG. 4A is a diagram conceptually illustrating an internal portion of the ECU 15 included in the electrically powered suspension system 11 according to the first embodiment of the present invention. FIG. 4B is an explanatory diagram of a damping force map which conceptually shows a relationship between a stroke velocity SV and a target damping force which changes corresponding to a change in the stroke velocity SV. FIG. 4C is an explanatory diagram of a first reduction ratio map 61 which conceptually shows a relationship between the stroke velocity SV and a reduction ratio LR which changes corresponding to the change in the stroke velocity SV. FIG. 4D is an explanatory diagram of a second reduction ratio map which conceptually shows how a characteristic value of the reduction ratio LR which changes corresponding to the stroke velocity SV follows a hysteresis track between an increase and a decrease in the stroke velocity SV. FIG. 4E is an explanatory diagram of an unadjusted and adjusted target telescopic force map 66 which conceptually shows a relationship between an unadjusted target telescopic force and an adjusted target telescopic force in response to occurrence of an adjustment request for a reduction in a telescopic control amount.

The Electrically Powered Suspension System 11 According to the First Embodiment of the Present Invention The ECU 15 included in the electrically powered suspension system 11 according to the first embodiment of the present invention includes a microcomputer which performs various arithmetic processes. The ECU 15 has a drive control function of generating drive forces for a damping operation and a telescopic operation by controlling drives of the multiple electromagnetic actuators 13 based on the rotation angle signals of the electric motors 31 and the like, which are detected by the resolvers 37.

For the purpose of realizing the drive control function, the ECU 15 includes an information acquirer 43, a drive force arithmetic part 47 and a drive controller 49, as illustrated in FIG. 3.

The information acquirer 43 acquires information about the stroke velocity SV by: acquiring the rotation angle signal of the electric motor 31, detected by the resolver 37, as time-series information about a stroke position; and differentiating the time-series information about the stroke position with respect to time, as illustrated in FIG. 3.

In addition, the information acquirer 43 acquires information about a sprung velocity BV: acquiring time-series information about a sprung acceleration detected by the sprung acceleration sensor 40; and differentiating the time-series information about the sprung acceleration with respect to time, as illustrated in FIG. 3.

Besides, as illustrated in FIG. 3, the information acquirer 43 acquires information about a vehicle speed detected by a vehicle speed sensor 41, information about a yaw rate detected by a yaw rate sensor 42, and information about a motor current to be supplied to the electric motor 31 for the purpose of realizing a target drive force of the electromagnetic actuator 13.

The information about the stroke velocity SV, the information about the sprung velocity By, the information about the vehicle speed, the information about the yaw rate and the information about the motor current which are acquired by the information acquirer 43 are sent to the drive force arithmetic part 47.

As illustrated in FIG. 4A, the drive force arithmetic part 47 includes a damping force calculator 51, a telescopic force calculator 53, an adjuster 75 and an adder 57.

The drive force arithmetic part 47 basically has a function of: calculating the target damping force serving as a target value of the damping operation of, and the target telescopic force serving as a target value of the telescopic operation, of the electromagnetic actuator 13; and obtaining a target drive force, an integration of the target damping force and the target telescopic force, through an arithmetic operation for the purpose of realizing the calculated target damping and telescopic forces.

Specifically, the damping force calculator 51 included in the drive force arithmetic part 47 calculates the value of the target damping force suitable for the stroke velocity SV, based on the information about the stroke velocity SV acquired by the information acquirer 43 and the target damping force map (see FIGS. 4A and 4B) 52 conceptually showing the relationship (target damping force characteristic) between the stroke velocity SV and the target damping force which changes corresponding to the stroke velocity SV. Incidentally, the target damping force map 52 actually stores a target value of a damping force control current as an equivalent to a value of the target damping force.

As illustrated in FIG. 4B, a change area (definition area) of the stroke velocity SV in the target damping force map 52 includes a first velocity area SV1 and a second velocity area SV2.

The first velocity area SV1 is a velocity area where the stroke velocity SV is equal to or less than a first velocity threshold SVth1 (|SV−SVth1|=<0). The first velocity threshold SVth1 is a threshold which defines a normal velocity area within the overall velocity area of the stroke velocity SV. Thus, most of the stroke velocities SV which occur in general paved road running scenes fall within the first velocity area SV1.

The second velocity area SV2 is a velocity area where the stroke velocity SV is greater than the first velocity threshold SVth1 (|SV−SVth1|>0). Thus, some of the stroke velocities SV which occur in hard running scenes, such as a running scene where a wheel of the vehicle 10 gets onto a step, reach the second velocity area SV2.

Incidentally, an appropriate value may be set as the first velocity threshold SVth1 as long as the value is obtained by referring to a result of evaluating a probability density function of the stroke velocity SV through an experiment, a simulation and the like, and makes an allocation ratio of the stroke velocity SV's appearance in the first velocity area SV1 to the stroke velocity SV's appearance in the second velocity area SV2 satisfy a predetermined allocation ratio.

Target damping force characteristics of the target damping force map 52 in the first velocity area SV1 include, as illustrated in FIG. 4B, a characteristic in which: as the stroke velocity SV becomes larger in a direction to the stretched side, the target damping force in a direction to the contracted side becomes substantially linearly larger; and as the stroke velocity SV becomes larger in a direction to the contracted side, the target damping force in a direction to the stretched side becomes substantially linearly larger. This characteristic corresponds to a damping characteristic of a conventionally-used hydraulic damper. Incidentally, when the stroke velocity SV is at 0, the corresponding target damping force is also at 0.

In addition, like the target damping force characteristics of the target damping force map 52 in the first velocity area SV1, target damping force characteristics of the target damping force map 52 in the second velocity area SV2 include, as illustrated in FIG. 4B, a characteristic in which: as the stroke velocity SV becomes larger in the direction to the stretched side, the target damping force in the direction to the contracted side becomes substantially linearly larger; and as the stroke velocity SV acquired by the information acquirer 43 becomes larger in the direction to the contracted side, the target damping force in the direction to the stretched side becomes substantially linearly larger.

It should be noted that the inclination of the target damping force characteristics of the target damping force map 52 in the second velocity area SV2 is set gentler than the inclination of the target damping force characteristics of the target damping force map 52 in the first velocity area SV1, as illustrated in FIG. 4B. This characteristic corresponds to the damping characteristic of the conventionally-used hydraulic damper.

Meanwhile, the telescopic force calculator 53 included in the drive force arithmetic part 47 calculates the value of the target telescopic force suitable for the sprung velocity BV, based on the information about the sprung velocity BV acquired by the information acquirer 43 and a target telescopic force map (not illustrated) conceptually showing a relationship (target telescopic force characteristics: complies with skyhook damper control of damping the vibration of the sprung member based on the sprung velocity BV) between the sprung velocity BV and the target telescopic force which changes corresponding to the sprung velocity By. Incidentally, the target telescopic force map actually stores a target value of a telescopic force control current as an equivalent to the target telescopic force.

An appropriate value may be set as the target telescopic force characteristics of the target telescopic force map as long as the value is obtained through an experiment, a simulation or the like performed to obtain the target telescopic force suitable the sprung velocity BV for the purpose of holding the orientation of the vehicle 10 in a predetermined condition.

Incidentally, a relationship between the target telescopic force characteristics of the target telescopic force map and the gist of the present invention is weak, and descriptions for the characteristics are omitted.

Basically, the adjuster 75 according to the first embodiment included in the drive force arithmetic part 47 performs an adjustment to reduce a telescopic control amount based on the target telescopic force for the purpose of realizing the control of the vibration of the vehicle 10 appropriately without disturbing the behavior of the vehicle 10 or impairing the ride quality performance of the vehicle 10 as much as possible, in the case where the electric motor 31 is operating near its output capacity limit. In this respect, a degree of reduction in the telescopic control amount means how much the telescopic control amount is reduced.

For the purpose of appropriately performing the adjustment to reduce the telescopic control amount, the adjuster 75 according to the first embodiment included in the drive force arithmetic part 47 includes a reduction ratio calculator 60 and a telescopic force corrector 65, as illustrated in FIG. 4A.

The reduction ratio calculator 60 included in the adjuster 75 according to the first embodiment calculates the value of the reduction ratio LR suitable for the stroke velocity SV, based on the information about the stroke velocity SV acquired by the information acquirer 43, and contents stored on the first reduction ratio map (see FIGS. 4A and 4C) 61. The first reduction ratio map 61 conceptually shows the relationship between the stroke velocity SV and the reduction ratio LR for the telescopic control amount which changes corresponding to the stroke velocity SV. The "reduction ratio LR for the telescopic control amount" will be hereinafter referred to as a "reduction ratio" in a short form in some cases.

The "reduction ratio LR for the telescopic control amount" means an index (ratio) used to perform the adjustment to reduce the telescopic control amount based on the target telescopic force for the purpose of performing the damping control for the effect of securing the driving stability of the vehicle 10 preferentially over the telescopic control for the securing of the ride quality performance of the vehicle 10 in the case where the electric motor 31 is operating near its output capacity limit.

[The First Reduction Ratio Map 61]

Next, referring to FIG. 4C, descriptions will be provided for the first reduction ratio map 61.

The first reduction ratio map 61 relates to the characteristic value of the reduction ratio LR which changes corresponding to a change in the stroke velocity SV. In the first reduction ratio map 61, the characteristic of the reduction ratio LR for (degree of reduction in) the telescopic control amount during an increase in the stroke velocity SV and the characteristic of the reduction ratio LR for (degree of reduction in) the telescopic control amount during a decrease in the stroke velocity SV are set at the common mode.

A change area (definition area) of the stroke velocity SV in the first reduction ratio map 61 includes three velocity areas in total, that is to say, an 11th definition area SVB-11, a 12th definition area SVB-12 and a 13th definition area SVB-13 in an order of increase in the stroke velocity SV, as illustrated in FIG. 4C.

The 11th definition area SVB-11 is a velocity area where the stroke velocity SV is equal to or less than an 11th velocity threshold SVth11 (|SV−SVth11|=<0). Like the first velocity threshold SVth1, the 11th velocity threshold SVth11 is an upper limit threshold which defines the normal velocity area within the overall velocity area of the stroke velocity SV. Thus, most of the stroke velocities SV which occur in general paved road running scenes fall within the 11th definition area SVB-11.

Incidentally, in the embodiment, the 11th velocity threshold SVth11 is set at a value which is different from a value of the first velocity threshold SVth1 in the target damping force map 52 (for example, the first velocity threshold SVth1<the 11th velocity threshold SVth11).

The 12th definition area SVB-12 and the 13th definition area SVB-13 are both velocity areas where the stroke velocity SV is greater than the 11th velocity threshold SVth11 (|SV−SVth11|>0). Thus, some of the stroke velocities SV which occur in hard running scenes, such as a running scene where a wheel of the vehicle 10 gets onto a step, reach the 12th definition area SVB-12 and the 13th definition area SVB-13.

In the embodiment, the 12th definition area SVB-12 and the 13th definition area SVB-13 are separated from each other by a 12th velocity threshold SVth12. The 12th velocity threshold SVth12 is a threshold which divides the high velocity area reached by the stroke velocity SV to occur in hard running scenes into two parts. The stroke velocity SV belonging to the 13th definition area SVB-13 is set higher than the stroke velocity SV belonging to the 12th definition area SVB-12.

Incidentally, in the embodiment, the 12th definition area SVB-12 and the 13th definition area SVB-13 correspond to the second velocity area SV2 in the target damping force map 52.

Meanwhile, as illustrated in FIG. 4C, a value range of the reduction ratio LR corresponding to the definition area of the stroke velocity SV is set by a fixed value "1" of the reduction ratio LR, a 12 h value range SVA-12 (1>SVA-12>0.2) and a fixed value "0.2" of the reduction ratio LR.

The definition area of the stroke velocity SV and the value range (range of 0 to 1 in the case illustrated in FIG. 4C) of the reduction ratio are associated with each other by predetermined functions.

For example, the values of the stroke velocity SV which belong to the 11th definition area SVB-11 are replaced with the fixed value "1" of the reduction ratio LR by a predetermined many-to-one function.

The reason for this configuration is that both the effect of securing the driving stability of the vehicle 10 through the damping control and the effect of securing the ride quality performance of the vehicle 10 through the telescopic control are intended to be realized at the same time by the assignment of the fixed value (LR=1, representing no need for the adjustment to reduce the telescopic control amount), as the value of the reduction ratio LR, to the 11th definition area SVB-11 where the stroke velocity SV is so low that the adjustment to reduce the telescopic control amount is not needed.

In addition, for example, the values of the stroke velocity SV which belong to the 12th definition area SVB-12 are replaced by a predetermined linear function F11, uniquely corresponding to the values of the reduction ratio LR which belong to the 12h value range SVA-12. For example, the 11th velocity threshold SVth11 is replaced with a value (1) of the reduction ratio LR. Furthermore, the 12th velocity threshold SVth12 is replaced with a value (0.2) of the reduction ratio LR.

The reason for this configuration is that the effect of securing the ride quality performance of the vehicle 10 through the telescopic control is intended to be kept as long as possible while prioritizing the effect of securing the driving stability of the vehicle 10 through the damping control, by the assignment of a variable value having a linear characteristic in which the value of the reduction ratio LR decreases corresponding to an increase in the stroke velocity SV, as the value of the reduction ratio LR, to the 12th definition area SVB-12 where the stroke velocity SV is enough to leave the telescopic control amount as much as possible although the adjustment to reduce the telescopic control amount is needed (by the adjustment to gradually increase the degree of reduction in the telescopic control amount).

Moreover, for example, the values of the stroke velocity SV which belong to the 13th definition area SVB-13 are replaced with a fixed value of the reduction ratio LR (LR=0.2) by a predetermined many-to-one function.

The reason for this configuration is that the effect of securing the driving stability of the vehicle 10 through the damping control is intended to be prioritized over the effect of securing the ride quality performance of the vehicle 10 through the telescopic control, by the assignment of a fixed value (for example, LR=0.2, representing an adjustment to be performed to increase the degree of reduction in the telescopic control amount at the highest level), as the value of the reduction ratio LR, to the 13th definition area SVB-13 where the stroke velocity SV requires an adjustment to increase the degree of reduction in the telescopic control amount at the highest level.

It should be noted that a configuration may be employed in which the characteristic value of the reduction ratio LR which changes corresponding to the change in the stroke velocity SV follows one hysteresis track in a case where the stroke velocity SV has an increase trend TRU, and another hysteresis track in a case where the stroke velocity SV has a decrease trend TRD. The reduction ratio map having such characteristic values of the reduction ratio LR is referred to as a "second reduction ratio map 62."

[The Second Reduction Ratio Map 62]

Referring to FIG. 4D, descriptions will be provided for the second reduction ratio map 62.

Part of the first reduction ratio map 61 and part of the second reduction ratio map 62 are common to each other in terms of the characteristic value of the reduction ratio LR which changes corresponding to the change in the stroke velocity SV.

Incidentally, in the first reduction ratio map 61, the characteristic of the reduction ratio LR for (degree of reduction in) the telescopic control amount during the increase in the stroke velocity SV and the characteristic of the reduction ratio LR for (degree of reduction in) the telescopic control amount during the decrease in the stroke velocity SV are set in a common mode.

In other words, in the first reduction ratio map 61, the characteristic values of the reduction ratio LR are common regardless of the increase/decrease trend of the stroke velocity SV, that is to say, whether the stroke velocity SV is in the increase trend TRU or in the decrease trend TRD.

In contrast to this, in the second reduction ratio map 62, the characteristic of the reduction ratio LR for (degree of reduction in) the telescopic control amount during the increase in the stroke velocity SV and the characteristic of the reduction ratio LR for (degree of reduction in) the telescopic control amount during the decrease in the stroke velocity SV are set in mutually-different modes.

In other words, in the second reduction ratio map 62, the characteristic value of the reduction ratio LR follows one hysteresis track while the stroke velocity SV is in the increase trend TRU, and another hysteresis track while the stroke velocity SV is in the decrease trend TRD.

Incidentally, information about whether the stroke velocity SV is in the increase trend TRU or in the decrease trend TRD may be acquired by the information acquirer 43, for example, through the following procedure.

Specifically, the time-series information about the stroke position which changes with time is sequentially inputted into the information acquirer 43 at predetermined cycle time intervals. Subsequently, differences between stroke positions adjacent in time (that is to say, the stroke velocities SV) are calculated and arranged in time series.

Thereafter, the information about whether the stroke velocity SV is in the increase trend TRU or in the decrease trend TRD may be acquired by appropriately evaluating from each two adjacent arranged values whether the stroke velocity SV is in an increase trend or in a decrease trend.

The following descriptions will be provided for the second reduction ratio map 62 with a focus put on the difference between the first reduction ratio map 61 and the second reduction ratio map 62.

A change area (definition area) of the stroke velocity SV in the second reduction ratio map 62 includes three velocity areas in total, that is to say, an 14th definition area SVB-14, a 15th definition area SVB-15 and a 16th definition area SVB-16 in an order of decrease in the stroke velocity SV, as illustrated in FIG. 4D.

The 14th definition area SVB-14 is a velocity area where the stroke velocity SV is greater than a 13th velocity threshold SVth13 (|SV−SVth13|>0) while the stroke velocity SV is in the decrease trend TRD. The 13th velocity threshold SVth13 is set at a value which is greater than the 11th velocity threshold SVth11 but less than the 12th velocity threshold SVth12 (SVth11<SVth13<SVth12).

The 13th velocity threshold SVth13 is a lower limit threshold which defines the highest velocity area in which to perform an adjustment to increase the degree of reduction in the telescopic control amount at the highest level, in the high velocity area reached by the stroke velocities SV which occur in hard running scenes while the stroke velocity SV is in the decrease trend TRD. Thus, some of the stroke velocities SV which occur in hard running scenes go beyond the 13th velocity threshold SVth13, and reach the 14th definition area SVB-14.

The 14th definition area SVB-14 corresponds to the 13th definition area SVB-13 (see FIG. 4C) in the first reduction ratio map 61 which is referred to while the stroke velocity SV is in the increase trend TRU. As illustrated in FIG. 4D, the values of the stroke velocity SV which belong to the 14th definition area SVB-14 are replaced with a fixed value of the reduction ratio LR (for example, LR=0.2, representing an adjustment to be performed to increase the degree of reduction in the telescopic control amount at the highest level).

The reason for this configuration is that while the stroke velocity SV is in the decrease trend TRD, the effect of securing the driving stability of the vehicle 10 through the damping control is designed to be prioritized over the effect of securing the ride quality performance of the vehicle 10 through the telescopic control, by the assignment of the fixed value (for example, LR=0.2, representing the need at the highest level for the adjustment to reduce the telescopic control amount), as the value of the reduction ratio LR, to the 14th definition area SVB-14 where the stroke velocity SV needs the adjustment to increase the degree of reduction in the telescopic control amount at the highest level.

Incidentally, the 14th definition area SVB-14 is expanded toward the low velocity side by a difference between the lower limit threshold (the 13th velocity threshold SVth13) for defining the highest velocity area and the lower limit threshold (the 12th velocity threshold SVth12) of the 13th definition area SVB-13.

The 15th definition area SVB-15 is a velocity area where the stroke velocity SV is equal to or less than the 13th velocity threshold SVth13 but greater than the 14th velocity threshold SVth14 (SVth14<SV=<SVth13) while the stroke velocity SV is in the decrease trend TRD. The 14th velocity threshold SVth14 is set at a value which is less than the 11th velocity threshold SVth11 (SVth14<SVth11).

The 14th velocity threshold SVth14 is a lower limit threshold which defines a high velocity area reached by the stroke velocities SV which occur in hard running scenes while the stroke velocity SV is in the decrease trend TRD. Thus, some of the stroke velocities SV which occur in hard running scenes go beyond the 14th velocity threshold SVth14 and reach the 15th definition area SVB-15.

The 15th definition area SVB-15 corresponds to the 12th definition area SVB-12 (see FIG. 4C) in the first reduction ratio map 61 which is referred to while the stroke velocity SV is in the increase trend TRU. The values of the stroke velocity SV which belong to the 15th definition area SVB-15 are replaced by a predetermined linear function F12, uniquely corresponding to the values of the reduction ratio LR which belong to the 12h value range SVA-12. For example, the 13th velocity threshold SVth13 is replaced with a value "0.2" of the reduction ratio LR. Furthermore, the 14th velocity threshold SVth14 is replaced with a value "1" of the reduction ratio LR.

The reason for this configuration is that the effect of securing the ride quality performance of the vehicle 10 through the telescopic control is intended to be kept as long as possible while prioritizing the effect of securing the driving stability of the vehicle 10 through the damping control, by the assignment of a variable value having a linear characteristic in which the value of the reduction ratio LR becomes larger as the stroke velocity SV becomes smaller, as the value of the reduction ratio LR, to the 15th definition area SVB-15 where the stroke velocity SV is enough to leave the telescopic control amount as much as possible although the adjustment to increase the degree of reduction in the telescopic control amount is needed (by the adjustment to be performed while gradually decreasing the degree of reduction in the telescopic control amount).

Incidentally, the 15th definition area SVB-15 is shifted to the low velocity side by a predetermined velocity difference (SVth11–SVth14) between the lower limit threshold (the 14th velocity threshold SVth14) for defining the high velocity area and the lower limit threshold (the 11th velocity threshold SVth11) of the 12th definition area SVB-12.

The 16th definition area SVB-16 is a velocity area where the stroke velocity SV is equal to or less than the 14th velocity threshold SVth14 (SV=<SVth14) while the stroke velocity SV is in the decrease trend TRD.

The 14th velocity threshold SVth14 is an upper limit threshold which defines the normal velocity area within the overall velocity area of the stroke velocity SV while the stroke velocity SV is in the decrease trend TRD. Thus, most of the stroke velocities SV which occur in general paved road running scenes fall within the 16th definition area SVB-16 where the stroke velocity SV is equal to or less than the 14th velocity threshold SVth14.

The 16th definition area SVB-16 corresponds to the 11th definition area SVB-11 (see FIG. 4C) in the first reduction ratio map 61 which is referred to while the stroke velocity SV is in the increase trend TRU. As illustrated in FIG. 4D, the values of the stroke velocity SV which belong to the 16th definition area SVB-16 are replaced with a fixed value of the reduction ratio LR (LR=1).

The reason for this configuration is that both the effect of securing the driving stability of the vehicle 10 through the damping control and the effect of securing the ride quality performance of the vehicle 10 through the telescopic control are intended to be realized at the same time by the assignment of the fixed value (LR=1, representing no need for the adjustment to reduce the telescopic control amount), as the value of the reduction ratio LR, to the 16th definition area SVB-16 where the stroke velocity SV is so low that the adjustment to increase the degree of reduction in the telescopic control amount is not needed.

Incidentally, the 16th definition area SVB-16 is contracted toward the low velocity side by a velocity difference (SVth11–SVth14) between the upper limit threshold (the 14th velocity threshold SVth14) for defining the normal velocity area and the lower limit threshold (the 11th velocity threshold SVth11) of the 11th definition area SVB-11.

In short, in the second reduction ratio map 62, the threshold of the stroke velocity SV which serves as the starting point of reducing the telescopic control amount while the stroke velocity SV is increasing (that is to say, the 11th velocity threshold SVth11) is set at a value smaller than the threshold of the stroke velocity SV which serves as the starting point of increasing the telescopic control amount while the stroke velocity SV is decreasing (that is to say, the 13th velocity threshold SVth13) (where SVth11<SVth13).

This makes it possible to more enhance the effect of prioritizing the securing of the driving stability of the vehicle 10 through the damping control over the securing of the ride quality performance of the vehicle 10 through the telescopic control.

The value of the reduction ratio LR calculated by the reduction ratio calculator 60 included in the adjuster 75 according to the first embodiment by referring to the first reduction ratio map 61 or the second reduction ratio map 62 (generically referred to as "reduction ratio maps 61, 62" in some cases) is referred to by the telescopic force corrector 65 included in the adjuster 75 when the target telescopic force calculated by the telescopic force calculator 53 included in the drive force arithmetic part 47 is corrected corresponding to the change in the stroke velocity SV. This will be described in detail as follows.

As illustrated in FIG. 4A, first of all, the telescopic force corrector 65 included in the adjuster 75 according to the first embodiment receives the target telescopic force calculated by the telescopic force calculator 53 as an unadjusted target telescopic force, and receives the value of the reduction ratio LR calculated by the reduction ratio calculator 60 included in the adjuster 75.

Thereafter, the telescopic force corrector 65 calculates an adjusted target telescopic force based on: the information about the unadjusted target telescopic force; and the unadjusted and adjusted target telescopic force map 66 which conceptually shows the relationship between the adjustment request for a reduction in the telescopic control amount and the unadjusted and adjusted target telescopic forces. The adjusted target telescopic force calculated by the telescopic force corrector 65 is sent to the adder 57 included in the drive force arithmetic part 47.

As illustrated in FIG. 4A, the adder 57 included in the drive force arithmetic part 47 of the ECU 15 obtains the target drive force by adding up the target damping force calculated by the damping force calculator 51 and a corrected target telescopic force resulting from the adjustment to the telescopic control amount, and obtains a drive control signal for realizing the target drive force. The drive control signal as the result of the arithmetic operation performed by the drive force arithmetic part 47 is sent to the drive controller 49.

Based on the drive control signal sent from the drive force arithmetic part 47, the drive controller 49 controls the drives of the multiple electromagnetic actuators 13 independently of one another by supplying the drive control powers to the electric motors provided to the multiple electromagnetic actuators 13, respectively.

It should be noted that, for example, an inverter control circuit may be appropriately used to generate drive control power to be supplied to the electric motor 31.

[The Unadjusted and Adjusted Target Telescopic Force Map 66]

Next, descriptions will be provided for the unadjusted and adjusted target telescopic force map 66.

As illustrated in FIG. 4E, the unadjusted and adjusted target telescopic force map 66 conceptually shows a relationship between the unadjusted target telescopic force and the adjusted target telescopic force in response to the occurrence of the adjustment request for a reduction in the telescopic control amount. In the following descriptions, a definition area TSB of the unadjusted target telescopic force is a value range to which the unadjusted target telescopic force belongs. Meanwhile, a value area TSA of the adjusted target telescopic force is a value range to which the adjusted target telescopic force belongs.

Incidentally, the definition area TSB of the unadjusted target telescopic force and the value area TSA of the adjusted target telescopic force are associated with each other by a predetermined function. This will be described in detail later.

In the unadjusted and adjusted target telescopic force map 66, as indicated by the horizontal axis in FIG. 4E, a 21th unadjusted target telescopic force TSb21, a 22nd unadjusted target telescopic force TSb22 and a 23rd unadjusted target telescopic force TSb23 (where TSb21<TSb22<TSb23) are set in the definition area TSB of the unadjusted target telescopic force.

It should be noted that the 22nd unadjusted target telescopic force TSb22 is a variable value which changes corresponding to the value of the reduction ratio LR (the degree of reduction in the telescopic control amount) calculated by the reduction ratio calculator 60. This will be described in detail later.

The definition area TSB of the unadjusted target telescopic force includes: a 21st definition area TSB-21 ranging from zero to the 21th unadjusted target telescopic force TSb21; a 22nd definition area TSB-22 ranging from the 21th unadjusted target telescopic force TSb21 to the 23rd unadjusted target telescopic force TSb23; a 23rd definition area TSB-23 ranging from zero to the 22nd unadjusted target telescopic force TSb22; and a 24th definition area TSB-24 ranging from the 22nd unadjusted target telescopic force TSb22 to the 23rd unadjusted target telescopic force TSb23.

Meanwhile, as indicated by the vertical axis in FIG. 4E, a 21st adjusted target telescopic force TSa21 and a 23rd adjusted target telescopic force TSa23 (where TSa21>TSa23) are set in the value area TSA of the adjusted target telescopic force.

The value area TSA of the adjusted target telescopic force includes: a 21st value area TSA-21 ranging from zero to the 21st adjusted target telescopic force TSa21; and a 23rd value area TSA-23 ranging from zero to the 23rd adjusted target telescopic force TSa23.

The definition area TSB of the unadjusted target telescopic force and the value area TSA of the adjusted target telescopic force are associated with each other by the predetermined function.

Incidentally, in some cases, the 21st to 24th definition areas TSB-21 to 24 of the unadjusted target telescopic force will be generically referred to simply as a "value area TSB of the unadjusted target telescopic force" unless specifically identified.

In addition, in some cases, the 21st and 23rd value area TSA-21, 23 of the adjusted target telescopic force will be generically referred to simply as a "value area TSA of the adjusted target telescopic force" unless specifically identified.

More specifically, along the vertical axis in FIG. 4E, the 21st and 23rd value areas TSA-21, 23 of the adjusted target telescopic force or a fixed value (discussed in detail later) are associated with the 21st to 24th definition areas TSB-21 to 24 of the unadjusted target telescopic force (discussed in detail later) by a predetermined linear function or a predetermined many-to-one function.

The 21st definition area TSB-21 is a definition area of the unadjusted target telescopic force during the normal operation which does not require the adjustment to increase the degree of reduction in the telescopic control amount (where the electric motor 31 operates with enough room left over its output capacity).

The unadjusted target telescopic force belonging to the 21st definition area TSB-21 is uniquely replaced with the adjusted target telescopic force belonging to the 21st value area TSA-21 by a predetermined linear function F21. For example, the 21st unadjusted target telescopic force TSb21 is uniquely replaced with the 21st adjusted target telescopic force TSa21.

Like the 21st definition area TSB-21, the 22nd definition area TSB-22 is a definition area of the unadjusted target telescopic force during the normal operation which does not require the adjustment to increase the degree of reduction in the telescopic control amount.

The unadjusted target telescopic force belonging to the 22nd definition area TSB-22 is uniquely replaced with the 21st adjusted target telescopic force TSa21 by the predetermined many-to-one function. In this case, the fixed value "1" (representing no need for the adjustment to increase the degree of reduction in the telescopic control amount) is used as the value of the reduction ratio LR (the degree of reduction in the telescopic control amount). Thus, as illustrated in FIG. 4E, the 21st adjusted target telescopic force TSa21 is expressed with $$TSa21 = F\_lim * 1,$$

where F_lim is the telescopic force upper limit value, and 1 is the reduction ratio value.

The 23rd definition area TSB-23 is a definition area of the unadjusted target telescopic force during the abnormal operation which requires the adjustment to increase the degree of reduction in the telescopic control amount (where the electric motor 31 operates near its output capacity limit). The 23rd definition area TSB-23 is a variable area which changes its width corresponding to the adjustment to the 22nd unadjusted target telescopic force TSb22, which is a variable value. This will be described in detailed later.

The unadjusted target telescopic force belonging to the 23rd definition area TSB-23 is uniquely replaced with the adjusted target telescopic force belonging to the 23rd value area TSA-23 by the predetermined linear function F21. For example, the 22nd unadjusted target telescopic force TSb22 is uniquely replaced with the 23rd adjusted target telescopic force TSa23 (in the case illustrated in FIG. 4E, $$TSa23 = F\_lim * 0.2,$$

where F_lim is the telescopic force upper limit value, and 0.2 is the reduction ratio value).

Like the 23rd definition area TSB-23, the 24th definition area TSB-24 is a definition area of the unadjusted target telescopic force during the abnormal operation which requires the adjustment to increase the degree of reduction in the telescopic control amount. Like the 23rd definition area TSB-23, the 24th definition area TSB-24 is a variable area which changes its width corresponding to the adjustment to the 22nd unadjusted target telescopic force TSb22, which is a variable value. This will be described in detailed later.

The unadjusted target telescopic force belonging to the 24th definition area TSB-24 (ranging from the 22nd unadjusted target telescopic force TSb22 to the 23rd unadjusted target telescopic force TSb23) is replaced with the 23rd adjusted target telescopic force TSa23, which is a variable value, by the predetermined many-to-one function. In the case illustrated in FIG. 4E, the unadjusted target telescopic force belonging to the 24th definition area TSB-24 is replaced with the 23rd adjusted target telescopic force TSa23, which is expressed with $$TSa23 = F\_lim * 0.2,$$

where F_lim is the telescopic force upper limit value, and 0.2 is the reduction ratio value).

In the case where the electric motor 31 operates near its output capacity limit, the electrically powered suspension system 11 according to the first embodiment of the present invention operates to perform the adjustment to reduce the telescopic control amount based on the target telescopic force for the purpose of performing the damping control for the securing of the driving stability of the vehicle 10 preferentially over the telescopic control for the securing of the ride quality performance of the vehicle 10.

Here, descriptions will be provided for how the electrically powered suspension system 11 according to the first embodiment of the present invention reflects the value of the reduction ratio LR calculated by the reduction ratio calculator 60 (the degree of reduction in the telescopic control amount) on the corrected target telescopic force resulting from the adjustment to the telescopic control amount.

This reflection is realized by changing the 22nd unadjusted target telescopic force TSb22, which is a variable value, corresponding to the value of the reduction ratio LR calculated by the reduction ratio calculator 60 included in the adjuster 75 (the degree of reduction in the telescopic control amount).

Specifically, for example, in the case where the value of the reduction ratio LR calculated by the reduction ratio calculator 60 is at "1" (in the case where the degree of reduction in the telescopic control amount is at 0, representing no need for the adjustment to increase the degree of reduction in the telescopic control amount), the 22nd unadjusted target telescopic force TSb22 is also adjusted to become equal to a value based on the 21st unadjusted target telescopic force TSb21. Corresponding to this adjustment, the widths of the 23rd and 24th definition areas TSB-23, 24 which are each a variable area (their lengths along the horizontal axis in the diagram illustrated in FIG. 4E) are also adjusted as appropriate.

Furthermore, for example, in the case where the value of the reduction ratio LR calculated by the reduction ratio calculator 60 is at "0.2" (in the case where the degree of reduction in the telescopic control amount is the highest, representing the need at the highest level for the adjustment to increase the degree of reduction in the telescopic control amount), the 22nd unadjusted target telescopic force TSb22 is also adjusted to becomes equal to a value suitable for the value "0.2" of the reduction ratio LR. Corresponding to this adjustment, the widths of the 23rd and 24th definition areas TSB-23, 24, which are each a variable area, are also adjusted as appropriate.

Moreover, for example, in a case where the value of the reduction ratio LR calculated by the reduction ratio calculator 60 is at "0.4" (in a case where the degree of reduction in the telescopic control amount is middle), the 22nd unadjusted target telescopic force TSb22 is also adjusted to becomes equal to a value which is substantially a half of the 21st unadjusted target telescopic force TSb21. Corresponding to this adjustment, the widths of the 23rd and 24th definition areas TSB-23, 24, which are each a variable area, are also adjusted as appropriate.

Figure 4F:
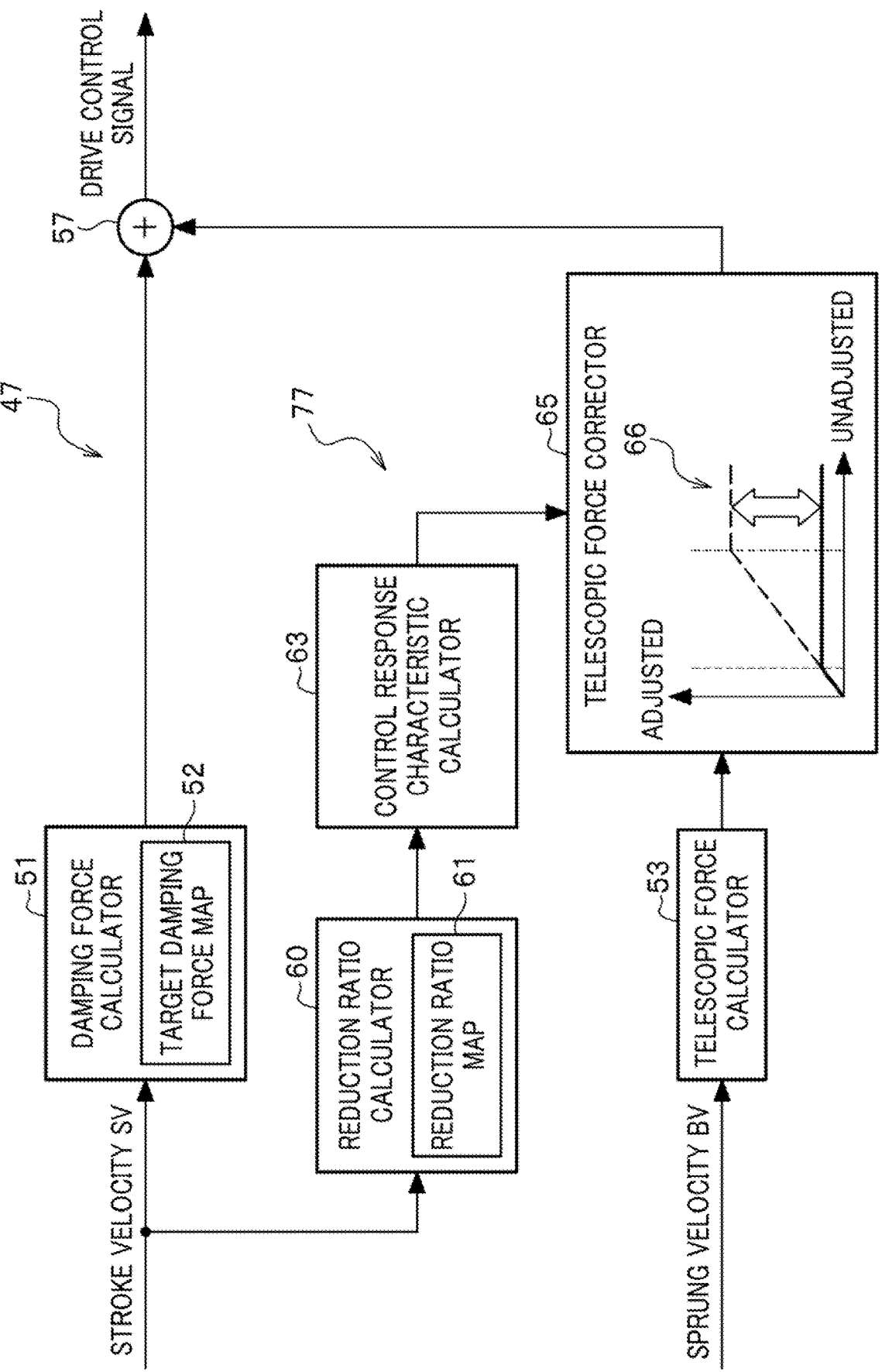
FIG. 4F is a diagram conceptually illustrating an internal portion of the ECU included in the electrically powered suspension system according to the second embodiment of the present invention.

The Electrically Powered Suspension System 11 According to the Second Embodiment of the Present Invention Next, referring to FIG. 4F, descriptions will be provided for the electrically powered suspension system 11 according to the second embodiment of the present invention. FIG. 4F is a diagram conceptually illustrating an internal portion of the ECU 15 included in the electrically powered suspension system 11 according to the second embodiment of the present invention.

Many components are common between the electrically powered suspension system 11 according to the second embodiment of the present invention and the electrically powered suspension system 11 according to the first embodiment of the present invention. The electrically powered suspension system 11 according to the second embodiment of the present invention will be described with a focus put on the difference between the electrically powered suspension system 11 according to the second embodiment of the present invention and the electrically powered suspension system 11 according to the first embodiment of the present invention.

The electrically powered suspension system 11 according to the second embodiment of the present invention is different from the electrically powered suspension system 11 according to the first embodiment of the present invention in that the electrically powered suspension system 11 according to the second embodiment of the present invention includes an adjuster 77 according to the second embodiment while the electrically powered suspension system 11 according to the first embodiment of the present invention includes the adjuster 75 according to the first embodiment.

Furthermore, the adjuster 75 according to the first embodiment, as illustrated in FIG. 4A, includes the reduction ratio calculator 60 and the telescopic force corrector 65, whereas the adjuster 77 according to the second embodiment includes a control response characteristic calculator 63 in addition to the reduction ratio calculator 60 and the telescopic force corrector 65.

The control response characteristic calculator 63 included in the adjuster 77 according to the second embodiment is set to delay a response characteristic of the adjustment to decrease the degree of reduction in the telescopic control amount (the adjustment to increase the value of the reduction ratio LR) in comparison with a response characteristic of the adjustment to increase the degree of reduction in the telescopic control amount (the adjustment to decrease the value of the reduction ratio LR) with respect to time, as illustrated in FIG. 4F.

The control response characteristic calculator 63 included in the adjuster 77 according to the second embodiment calculates a mode of the response characteristic of the adjustment to increase or decrease the degree of reduction in the telescopic control amount (the adjustment to increase or decrease the value of the reduction ratio LR), based on: the information about the stroke velocity SV acquired by the information acquirer 43 (including the information about the directional trend of the stroke velocity SV, that is to say, whether the stroke velocity SV is in the increase trend TRU or in the decrease trend TRD); and the value of the reduction ratio LR suitable for the stroke velocity SV calculated by the reduction ratio calculator 60 by referring to the first reduction ratio map 61.

Figure 6A:
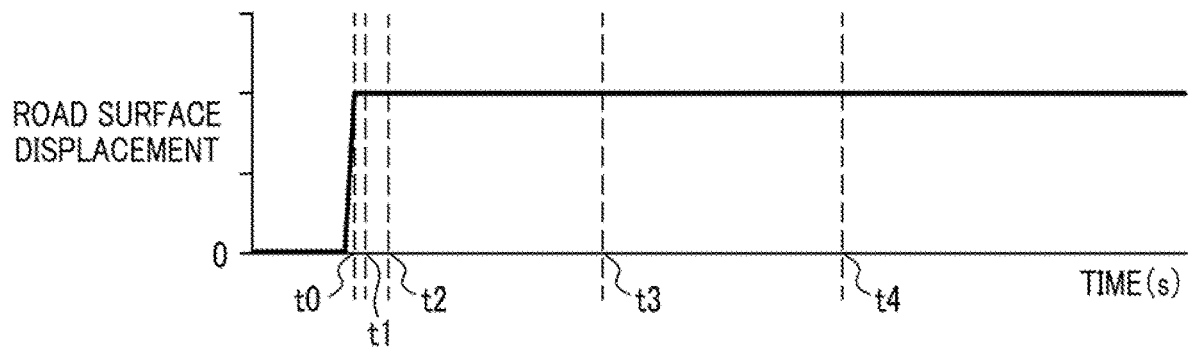
FIG. 6A is a time chart diagram of a road surface displacement which is used to explain how the electrically powered suspension system according to the second embodiment works.
Figure 6B:
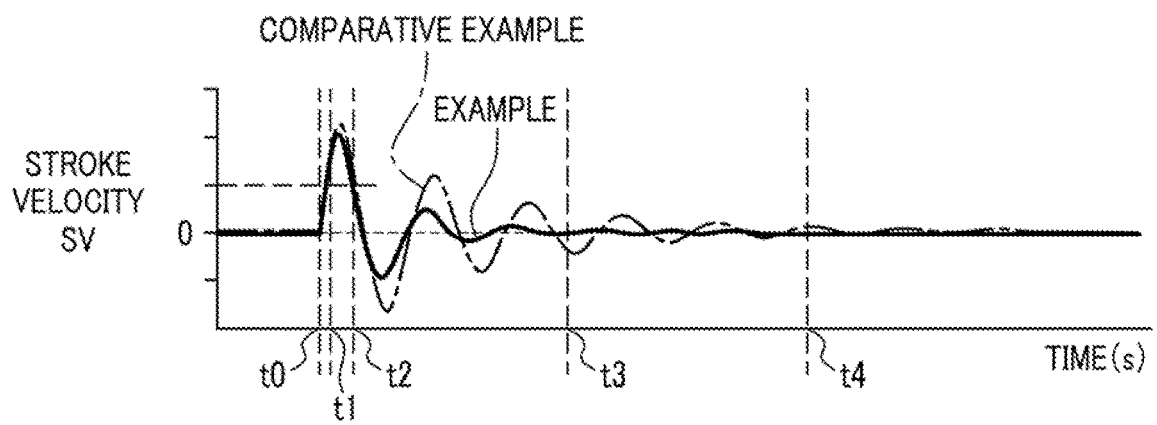
FIG. 6B is a time chart diagram of the stroke velocity which is used to explain how the electrically powered suspension system according to the second embodiment works.
Figure 6C:
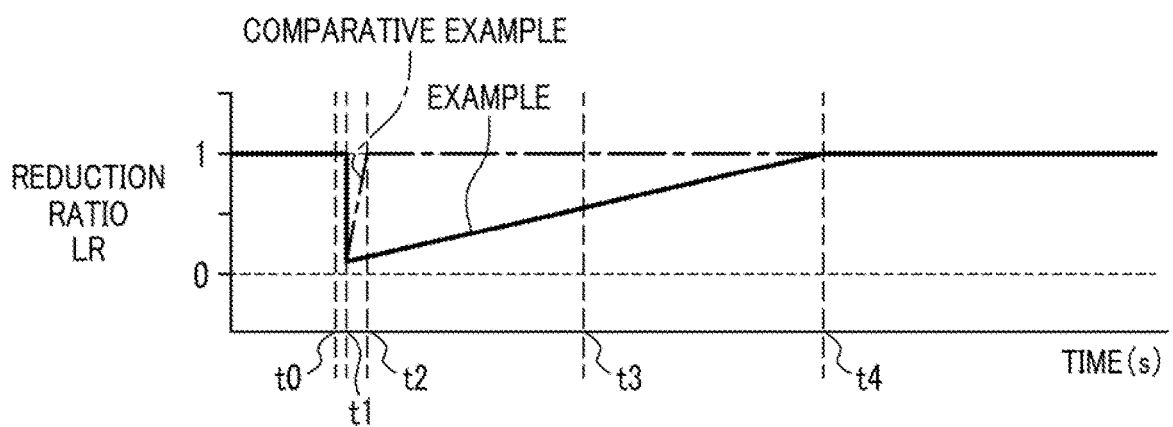
FIG. 6C is a time chart diagram of the reduction ratio which is used to explain how the electrically powered suspension system according to the second embodiment works.

The control response characteristic calculator 63, for example, employs a response characteristic without the time delay as the mode of the response characteristic of the adjustment to increase the degree of reduction in the telescopic control amount (the adjustment to increase the value of the reduction ratio LR), and on the other hand, employs a response characteristic with the time delay as the mode of the response characteristic of the adjustment to decrease the degree of reduction in the telescopic control amount (the adjustment to decrease the value of the reduction ratio LR). Referring to FIGS. 6A to 6C, detailed description will be provided for how the control response characteristic calculator 63 works.

How the Electrically Powered Suspension System 11 According to the First Embodiment of the Present Invention Works Next, referring to FIG. 5, descriptions will be provided for how the electrically powered suspension system 11 according to the first embodiment of the present invention works. FIG. 5 is a flowchart diagram which is used to explain how the electrically powered suspension system 11 according to the first embodiment of the present invention works.

In step S11 (a stroke velocity acquiring step) illustrated in FIG. 5, the information acquirer 43 of the ECU 15 acquires the information about the stroke velocity SV by: acquiring the rotation angle signal of the electric motor 31, detected by the resolver 37, as the time-series information about the stroke position; and differentiating the time-series information about the stroke position with respect to time. The thus-acquired information about the stroke velocity SV is sent to the drive force arithmetic part 47.

In step S12 (a sprung velocity acquiring step), the information acquirer 43 of the ECU 15 acquires the information about the sprung velocity BV by: acquiring the time-series information about the sprung acceleration detected by the sprung acceleration sensor 40; and differentiating the time-series information about the sprung acceleration with respect to time. The thus-acquired information about the sprung velocity BV is sent to the drive force arithmetic part 47.

In step S13 (a target damping force and target telescopic force calculating step), the damping force calculator 51 included in the drive force arithmetic part 47 of the ECU 15 calculates a value of the target damping force suitable for the stroke velocity SV, based on the information about the stroke velocity SV acquired in step S11, and the contents stored on the target damping force map 52 (see FIG. 4B).

In addition, the telescopic force calculator 53 included in the drive force arithmetic part 47 of the ECU 15 calculates a value of the target telescopic force suitable for the sprung velocity By, based on the information about the sprung velocity BV acquired in step S12, and the contents stored on the target telescopic force map.

In step S14, the adjuster 75 included in the drive force arithmetic part 47 of the ECU 15 determines whether the stroke velocity SV exceeds the 11th velocity threshold SVth11 (see FIG. 4C) (|SV−SVth11|=>0), that is to say, whether the electric motor 31 operates near its output capacity limit, based on the information about the stroke velocity SV acquired by the information acquirer 43.

If a result of the determination performed in step S14 is that the electric motor 31 is not in a condition of operating near its output capacity limit (if No step S14), the ECU 15 jumps the process flow to step S16.

On the other hand, if the result of the determination performed in step S14 is that the electric motor 31 is in the condition of operating near its output capacity limit (if Yes step S14), the ECU 15 makes the process flow proceed to the next step S15.

In step S15, the reduction ratio calculator 60 included in the adjuster 75 in the drive force arithmetic part 47 of the ECU 15 calculates a value of the reduction ratio LR suitable for the stroke velocity SV, based on the information about the stroke velocity SV acquired in step S11, and the contents stored on the reduction ratio maps (see FIGS. 4A and 4C, as well as FIG. 4D) 61, 62.

Subsequently, the telescopic force corrector 65 included in the adjuster 75 in the drive force arithmetic part 47 of the ECU 15 calculates an adjusted target telescopic force in compliance with the value of the reduction ratio LR, based on the information about the unadjusted target telescopic force calculated in step S13, and the contents stored on the unadjusted and adjusted target telescopic force map 66.

In step S16 (a drive force arithmetic process step), the adder 57 included in the drive force arithmetic part 47 of the ECU 15 obtains the target drive force by adding up the target damping force calculated by the damping force calculator 51 and the corrected target telescopic force resulting from the adjustment to the telescopic control amount, and obtains the drive control signal for realizing the target drive force through the arithmetic operation.

In step S17, the drive controller 49 of the ECU 15 controls the drives of the multiple electromagnetic actuators 13 by supplying the drive control powers to the electric motors 31 provided to the electromagnetic actuators 13 based on the drive control signals acquired through the arithmetic process in step S16, respectively.

[How the Electrically Powered Suspension System 11 According to the Second Embodiment Works]

Next, descriptions will be provided for how the electrically powered suspension system 11 with the adjustment to the telescopic control response characteristic according to the second embodiment works, in comparison with how an electrically powered suspension system 11 without the adjustment to the telescopic control response characteristic according to a comparative example works, referring to FIGS. 6A to 6C depending on the necessity. FIG. 6A is a time chart diagram of a road surface displacement which is used to explain how the electrically powered suspension system 11 according to the second embodiment works. FIG. 6B is a time chart diagram of the stroke velocity SV which is used to explain how the electrically powered suspension system 11 according to the second embodiment works. FIG. 6C is a time chart diagram of the reduction ratio LR which is used to explain how the electrically powered suspension system 11 according to the second embodiment works.

How the Electrically Powered Suspension System 11 without the Adjustment to the Telescopic Control Response Characteristic According to the Comparative Example Works To begin with, descriptions will be provided for how the electrically powered suspension system 11 without the adjustment to the telescopic control response characteristic according to the comparative example works, referring to FIGS. 6A to 6C depending on the necessity.

At time t0, a wheel of the vehicle 10 runs over a step. Thus, a stair-shaped road surface displacement occurs relative to the electrically powered suspension system 11 (see FIG. 6A).

At the same time t0, the stroke velocity SV (see FIG. 6B) is still at 0 (because the stair-shaped road surface displacement is delayed being reflected on the stroke velocity SV with respect to time), and the reduction ratio LR (see FIG. 6C) is still at "1" (representing no need for the adjustment to reduce the telescopic control amount).

At time t1, the wheel of the vehicle 10 returns to a steady condition after running over the step. Thus, the road surface displacement relative to the electrically powered suspension system 11 according to the comparative example returns to the normal value (see FIG. 6A).

At the same time t1, the stroke velocity SV (see FIG. 6B) is substantially at a peak wave height (since the road surface displacement is delayed being reflected on the stroke velocity SV with respect to time), and the value of the reduction ratio LR (see FIG. 6C) sharply decreases from "1" to "0.2" (representing the need at the highest level for the adjustment to increase the degree of reduction in the telescopic control amount).

In this respect, the operation to sharply decrease the value of the reduction ratio LR from "1" to "0.2" is based on the control to be performed to quickly correspond to the need at the highest level for the adjustment to increase the degree of the reduction in the telescopic control amount when the stroke velocity SV requiring the adjustment occurs.

In a period from time t1 to time t2, the vehicle 10 is running straightly on a maintained paved road. Thus, the road surface displacement relative to the electrically powered suspension system 11 according to the comparative example is held in the steady condition (see FIG. 6A).

In the same period from time t1 to time t2, the stroke velocity SV (see FIG. 6B) is in a transitional condition of gradually decreasing the wave height from its peak, and the value of the reduction ratio LR (see FIG. 6C) sharply increases linearly from "0.2" and returns to "1." This is based on the fact that the electrically powered suspension system 11 according to the comparative example does not adjust the telescopic control response characteristic.

Incidentally, at time t2, the stroke velocity SV (see FIG. 6B) still holds the wave height (has not fallen to 0 yet).

In a period from time t2 to time t3, the road surface displacement relative to the electrically powered suspension system 11 continues being held in the steady condition (see FIG. 6A).

In the same period from time t2 to time t3, the stroke velocity SV (see FIG. 6B) still holds the wave height (has not fallen to 0 yet). The value of the reduction ratio LR (see FIG. 6C) is held at "1."

In a period from time t3 to time t4, the road surface displacement relative to the electrically powered suspension system 11 continues being held in the steady condition (see FIG. 6A).

In the same period from time t3 to time t4, the stroke velocity SV (see FIG. 6B) decreases the wave height, and almost fades out the wave. The value of the reduction ratio LR (see FIG. 6C) continues being held at "1."

In sum, the electrically powered suspension system 11 without the adjustment to the telescopic control response characteristic according to the comparative example returns the value of the reduction ratio LR to "1" serving as the standard value by sharply increasing the value of the reduction ratio LR linearly from "0.2" in the period from time t1 to time t2, and thereby gently decreases and fades out the effect of the stair-shaped road surface displacement which occurs when the wheel of the vehicle 10 runs over the step, in a relatively long required time (t4−t0).

How the Electrically Powered Suspension System 11 with the Adjustment to the Telescopic Control Response Characteristic According to the Second Embodiment Works Next, descriptions will be provided for how the electrically powered suspension system 11 with the adjustment to the telescopic control response characteristic according to the second embodiment works, referring to FIGS. 6A to 6C depending on the necessity.

At time t0, a wheel of the vehicle 10 runs over a step, like in the comparative example. Thus, a stair-shaped road surface displacement occurs relative to the electrically powered suspension system 11 according to the second embodiment (see FIG. 6A).

At the same time t0, the stroke velocity SV (see FIG. 6B) is still at 0 (since the stair-shaped road surface displacement is delayed being reflected on the stroke velocity SV with respect to time), and the reduction ratio LR (see FIG. 6C) is still at "1" (representing no need for the adjustment to reduce the telescopic control amount), like in the comparative example.

At time t1, the wheel of the vehicle 10 returns to a steady condition after running over the step, like in the comparative example. Thus, the road surface displacement relative to the electrically powered suspension system 11 according to the second embodiment returns to the normal value (see FIG. 6A).

At the same time t1, the stroke velocity SV (see FIG. 6B) is substantially at a peak wave height (since the road surface displacement is delayed being reflected on the stroke velocity SV with respect to time), and the value of the reduction ratio LR (see FIG. 6C) sharply decreases from "1" to "0.2" (representing the need at the highest level for the adjustment to increase the degree of reduction in the telescopic control amount), like in the comparative example.

In a period from time t1 to time t2, the vehicle 10 is running straightly on a maintained paved road. Thus, the road surface displacement relative to the electrically powered suspension system 11 according to the second embodiment is held in the steady condition (see FIG. 6A), like in the comparative example.

In the same period from time t1 to time t2, the stroke velocity SV (see FIG. 6B) is in a transitional condition of gradually decreasing the wave height from its peak, and the value of the reduction ratio LR (see FIG. 6C) is in a transitional condition of gradually increasing from "0.2" linearly. This is based on the fact that the electrically powered suspension system 11 according to the second embodiment adjusts the telescopic control response characteristic (response delay time).

Incidentally, at time t2, the value of the reduction ratio LR increases only slightly from "0.2," and has not returned to "1" serving as the standard value yet.

In a period from time t2 to time t3, the road surface displacement relative to the electrically powered suspension system 11 according to the second embodiment continues being held in the steady condition (see FIG. 6A), like in the comparative example.

In the same period from time t2 to time t3, the stroke velocity SV (see FIG. 6B) is in the transitional condition of gradually decreasing the wave height from its peak and falling to 0, and the value of the reduction ratio LR (see FIG. 6C) is in the transitional condition of gradually increasing from "0.2" linearly.

Incidentally, at time t2, the value of the reduction ratio LR is at "0.6," and has not returned to "1" serving as the standard value yet.

In a period from time t3 to time t4, the road surface displacement relative to the electrically powered suspension system 11 continues being held in the steady condition (see FIG. 6A).

In the same period from time t3 to time t4, the value of the reduction ratio LR (see FIG. 6C) returns from "0.6" to "1" serving as the standard value, as the result of the gradual linear increase.

Incidentally, the stroke velocity SV (see FIG. 6B) is held in a condition of being substantially at 0.

In sum, the electrically powered suspension system 11 with the adjustment to the telescopic control response characteristic according to the second embodiment gently returns the value of the reduction ratio LR to "1" serving as the standard value by gradually increasing the value of the reduction ratio LR linearly from "0.2" in a return time (t4−t1) which is longer than the return time (t2−t1) of the comparative example, and thereby quickly decreases and fades out the effect of the stair-shaped road surface displacement which occurs when the wheel of the vehicle 10 runs over the step, in a required time (t3−t0) which is substantially a half of the required time of the comparative example.

It should be noted that in a case where the resonance frequency of the unsprung members is at 10 Hz, the return time (t4−t1) of the second embodiment may be appropriately set with consideration given to the amount of time that the unsprung members takes to make strokes, for example, in five cycles (not specifically limited). This is based on the findings that the vibration of the unsprung members ceases in a time equivalent to five cycles.

An Internal Configuration of an ECU 15 Included in an Electrically Powered Suspension System 11 According to a Modification of the First Embodiment of the Present Invention Next, referring to FIG. 7, descriptions will be provided for the internal configuration of the ECU 15 included in the electrically powered suspension system 11 according to the modification of the first embodiment of the present invention. FIG. 7 is a diagram conceptually illustrating the interior portion of the ECU 15 included in the electrically powered suspension system 11 according to the modification of the first embodiment of the present invention.

The configuration of the electrically powered suspension system 11 according to the first embodiment of the present invention which is illustrated in FIG. 4A and the configuration of the electrically powered suspension system 11 according to the modification of the first embodiment of the present invention which is illustrated in FIG. 7 are common in many parts.

The configuration of the electrically powered suspension system 11 according to the modification of the first embodiment of the present invention, therefore, will be described by explaining mainly what makes the electrically powered suspension system 11 according to the modification of the first embodiment of the present invention different from the electrically powered suspension system 11 according to the first embodiment of the present invention.

The electrically powered suspension system 11 according to the modification of the first embodiment of the present invention is different from the electrically powered suspension system 11 according to the first embodiment of the present invention illustrated in FIG. 4A in that the electrically powered suspension system 11 according to the modification is provided with a multiplier 67 included in an adjuster 85 in the drive force arithmetic part 47 instead of the telescopic force corrector 65 included in the adjuster 75 in the drive force arithmetic part 47 of the electrically powered suspension system 11 according to the first embodiment.

In the electrically powered suspension system 11 according to the modification of the first embodiment of the present invention, the multiplier 67 included in the adjuster 85 according to the modification receives the target telescopic force calculated by the telescopic force calculator 53 as the unadjusted target telescopic force, and receives the value of the reduction ratio LR calculated by the reduction ratio calculator 60 belonging to the adjuster 85. Subsequently, the multiplier 67 calculates the adjusted target telescopic force by multiplying the unadjusted target telescopic force by the value of the reduction ratio LR. The adjusted target telescopic force calculated by the multiplier 67 is sent to the adder 57 included in the drive force arithmetic part 47.

The rest of the configuration of the electrically powered suspension system 11 according to the modification of the first embodiment of the present invention is the same as that of the configuration of the electrically powered suspension system 11 according to the first embodiment of the present invention.

Figure 8:
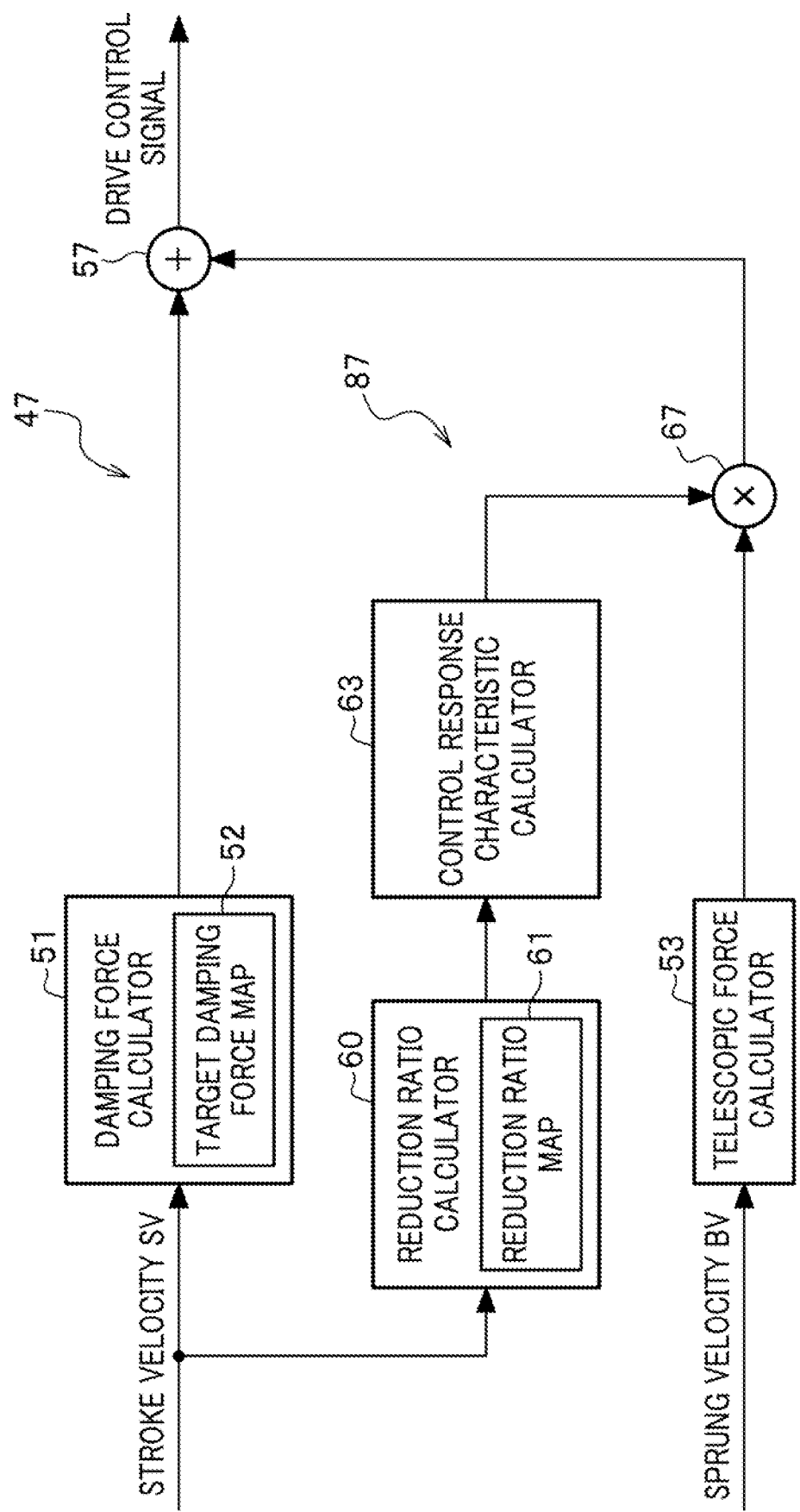
FIG. 8 is a diagram conceptually illustrating an internal portion of an ECU included in the electrically powered suspension system according to a modification of the second embodiment of the present invention.

An Internal Configuration of an ECU 15 Included in the Electrically Powered Suspension System 11 According to a Modification of the Second Embodiment of the Present Invention Next, referring to FIG. 8, descriptions will be provided for the internal configuration of the ECU 15 included in the electrically powered suspension system 11 according to the modification of the second embodiment of the present invention. FIG. 8 is a diagram conceptually illustrating the internal portion of the ECU 15 included in the electrically powered suspension system 11 according to the modification of the second embodiment of the present invention.

Many components are common between the electrically powered suspension system 11 according to the second embodiment of the present invention illustrated in FIG. 4F and the electrically powered suspension system 11 according to the modification of the second embodiment of the present invention illustrated in FIG. 8.

The configuration of the electrically powered suspension system 11 according to the modification of the second embodiment of the present invention will be described with a focus put on what makes the electrically powered suspension system 11 according to the modification of the second embodiment of the present invention different from the electrically powered suspension system 11 according to the second embodiment of the present invention.

The electrically powered suspension system 11 according to the modification of the second embodiment of the present invention is different from the electrically powered suspension system 11 according to the second embodiment of the present invention illustrated in FIG. 4F in that the electrically powered suspension system 11 according to the modification is provided with the multiplier 67 included in an adjuster 87 in the drive force arithmetic part 47 instead of the telescopic force corrector 65 included in the adjuster 77 in the drive force arithmetic part 47 of the electrically powered suspension system 11 according to the second embodiment.

In the electrically powered suspension system 11 according to the modification of the second embodiment of the present invention, the multiplier 67 included in the adjuster 87 according to the modification receives the target telescopic force calculated by the telescopic force calculator 53 as the unadjusted target telescopic force, and receives the value of the reduction ratio LR calculated by the reduction ratio calculator 60 belonging to the adjuster 87. Subsequently, the multiplier 67 calculates the adjusted target telescopic force by multiplying the unadjusted target telescopic force by the value of the reduction ratio LR. The adjusted target telescopic force calculated by the multiplier 67 is sent to the adder 57 included in the drive force arithmetic part 47.

The rest of the configuration of the electrically powered suspension system 11 according to the modification of the second embodiment of the present invention is the same as that of the configuration of the electrically powered suspension system 11 according to the second embodiment of the present invention.

Working and Effects of the Electrically Powered Suspension Systems 11 According to the Embodiments of the Present Invention The electrically powered suspension system 11 based on a first aspect includes: the electromagnetic actuator 13 which is provided between the vehicle body and the wheel of the vehicle 10, and which includes the electric motor 31 configured to generate drive forces for the damping operation and the telescopic operation; the information acquirer 43 which acquires the information about the stroke velocity SV of the electromagnetic actuator 13; the drive force arithmetic part 47 which includes the damping force calculator 51 configured to calculate the target damping force serving as the target value of the damping operation of the electromagnetic actuator 13, and the telescopic force calculator 53 configured to calculate the target telescopic force serving as the target value of the telescopic operation of the electromagnetic actuator 13, and which obtains the target drive force based on the target damping force calculated by the damping force calculator 51 and the target telescopic force calculated by the telescopic force calculator 53; and the drive controller 49 which controls the drive of the electric motor 31 using the target drive force obtained by the drive force arithmetic part 47.

The drive force arithmetic part 47 includes the adjuster 75, 77, 85, 87 which performs the adjustment to reduce the telescopic control amount for the target telescopic force based on the stroke velocity SV acquired by the information acquirer 43.

The configuration of the electrically powered suspension system 11 based on the first aspect corresponds to the configuration common to the electrically powered suspension systems 11 according to the first and second embodiments (including their modifications).

In the electrically powered suspension system 11 based on the first aspect, the drive force arithmetic part 47 includes the adjuster 75, 77, 85, 87 which performs the adjustment to reduce the telescopic control amount for the target telescopic force based on the stroke velocity SV acquired by the information acquirer 43. Thus, the adjuster 75, 77, 85, 87 performs the adjustment to reduce the telescopic control amount in the case where the stroke velocity SV is so high that the electric motor 31 can be considered as being operating near its output capacity limit. Thereby, the damping control for the securing of the driving stability of the vehicle 10 can be performed preferentially over the telescopic control for the securing of the ride quality performance of the vehicle 10.

The electrically powered suspension system 11 based on the first aspect is capable of achieving the control of the vibration of the vehicle 10 without disturbing the behavior of the vehicle 10 or impairing the ride quality performance of the vehicle 10 as much as possible even in the case where the electric motor 31 operates near its output capacity limit.

In addition, the electrically powered suspension system 11 based on a second aspect is the electrically powered suspension system 11 based on the first aspect, in which the adjuster 75, 77, 85, 87 included in the drive force arithmetic part 47 performs the adjustment to increase the degree of reduction in the telescopic control amount corresponding to the increase in the stroke velocity SV acquired by the information acquirer 43.

The configuration of the electrically powered suspension system 11 based on the second aspect corresponds to the configuration common to the electrically powered suspension systems 11 according to the first and second embodiments (including their modifications).

Since the adjuster 75, 77, 85, 87 performs the adjustment to increase the degree of reduction in the telescopic control amount corresponding to the increase in the stroke velocity SV, the electrically powered suspension system 11 based on the second aspect is capable of appropriately achieving the control of the vibration of the vehicle 10 without disturbing the behavior of the vehicle 10 or impairing the ride quality performance of the vehicle 10 as much as possible even in the case where the electric motor 31 included in the electromagnetic actuator 13 operates near its output capacity limit.

Furthermore, the electrically powered suspension system 11 based on a third aspect is the electrically powered suspension system 11 based on the second aspect, in which the adjuster 75, 77, 85, 87 included in the drive force arithmetic part 47 performs the adjustment to hold the degree of reduction in the telescopic control amount (representing the value of the reduction ratio LR) when the stroke velocity SV exceeds the predetermined velocity threshold SVth12 (see FIGS. 4C and 4D).

The configuration of the electrically powered suspension system 11 based on the third aspect corresponds to the configuration common to the electrically powered suspension systems 11 according to the first and second embodiments (including their modifications).

Since the adjustment is performed to hold the degree of reduction in the telescopic control amount when the stroke velocity SV exceeds the predetermined velocity threshold SVth12, the electrically powered suspension system 11 based on the third aspect is capable of keeping the effect of securing the ride quality performance of the vehicle 10 through the telescopic control as long as possible while prioritizing the effect of securing the driving stability of the vehicle 10 through the damping control, by holding the degree of reduction in the telescopic control amount regardless of the increase in the stroke velocity SV in addition to the working and effects of the electrically powered suspension system 11 based on the second aspect.

Moreover, the electrically powered suspension system 11 based on a fourth aspect is the electrically powered suspension system 11 based on the first aspect, in which in the adjuster 75, 85 included in the drive force arithmetic part 47, the characteristic of the degree of reduction in the telescopic control amount during the increase in the stroke velocity SV and the characteristic of the degree of reduction in the telescopic control amount during the decrease in the stroke velocity SV are set in the mutually-different modes.

The configuration of the electrically powered suspension system 11 based on the fourth aspect corresponds to the configuration of the electrically powered suspension system 11 according to the first embodiment (including its modification).

The electrically powered suspension system 11 based on the fourth aspect, the adjuster 75, 85 included in the drive force arithmetic part 47 performs the adjustment to increase or decrease the degree of reduction in the telescopic control amount appropriately using the characteristic of the degree of reduction in the telescopic control amount during the increase in the stroke velocity SV and the characteristic of the degree of reduction in the telescopic control amount during the decrease in the stroke velocity SV which are set in the mutually-different modes.

In addition to the working and effects of the electrically powered suspension system 11 based on the first aspect, the effect of stably realizing the adjustment to increase or decrease the degree of reduction in the telescopic control amount corresponding to the increase or decrease in the stroke velocity SV can be expected from the electrically powered suspension system 11 based on the fourth aspect.

Besides, the electrically powered suspension system 11 based on a fifth aspect is the electrically powered suspension system 11 based on the first aspect, in which in the adjuster 77, 87 included in the drive force arithmetic part 47, the response characteristic of the adjustment to increase the degree of reduction in the telescopic control amount and the response characteristic of the adjustment to decrease the degree of reduction in the telescopic control amount are set in the mutually-different modes.

The configuration of the electrically powered suspension system 11 based on the fifth aspect corresponds to the configuration of the electrically powered suspension system 11 according to the second embodiment (including its modification).

In addition to the working and effects of the electrically powered suspension system 11 based on the first aspect, the effect of setting the preferable response characteristic of the adjustment to increase or decrease the degree of reduction in the telescopic control amount to realize the adjustment of the degree of reduction in the telescopic control amount can be expected from the electrically powered suspension system 11 based on the fifth aspect, since the response characteristic of the adjustment to increase the degree of reduction in the telescopic control amount and the response characteristic of the adjustment to decrease the degree of reduction in the telescopic control amount are set in the mutually-different modes.

Furthermore, the electrically powered suspension system 11 based on a sixth aspect is the electrically powered suspension system 11 based on the fifth aspect, in which the adjuster 77, 87 included in the drive force arithmetic part 47 is set to delay the response characteristic of the adjustment to decrease the degree of reduction in the telescopic control amount in comparison with the response characteristic of the adjustment to increase the degree of reduction in the telescopic control amount with respect to time.

The configuration of the electrically powered suspension system 11 based on the sixth aspect corresponds to the configuration of the electrically powered suspension system 11 according to the second embodiment (including its modification).

In addition to the working and effects of the electrically powered suspension system 11 based on the fifth aspect, the following working and effects can be expected from the electrically powered suspension system 11 based on the sixth aspect, since the response characteristic of the adjustment to decrease the degree of reduction in the telescopic control amount (to lower the priority of the damping control over the telescopic control) is set to be delayed in comparison with the response characteristic of the adjustment to increase the degree of reduction in the telescopic control amount (to raise the priority of the damping control over the telescopic control) with respect to time.

The expected working and effects are that in the case where the electric motor 31 operates near its output capacity limit, the effect of securing the driving stability of the vehicle 10 through the damping control and the effect of securing the ride quality performance of the vehicle 10 through the telescopic control can be appropriately achieved at the same time since the effect of sufficiently suppressing the disturbance of the stroke velocity SV and securing the traction of the tire can be stably obtained.

Other Embodiments

The multiple embodiments discussed above are examples of how the present invention is embodied. These shall not be used to limitedly construe the technical scope of the present invention. This is because the present invention can be carried out in various modes without departing from the gist or main features of the present invention.

For example, the electrically powered suspension systems 11 according to the embodiments of the present invention have been described using an example where the 11th velocity threshold SVth11 is set at a value which is equal to the value of the first velocity threshold SVth1 in the target damping force map 52 (the 11th velocity threshold SVth11=the first velocity threshold SVth1). However, the present invention is not limited to this example.

The present invention may employ a configuration in which the 11th velocity threshold SVth11 is set at a value which is different from the value of the first velocity threshold SVth1 in the target damping force map 52.

In addition, the electrically powered suspension systems 11 according to the embodiments of the present invention have been described using an example where the 12th velocity threshold SVth12 is replaced with the fixed value "0.2" of the reduction ratio LR. However, the present invention is not limited to this example.

The present invention imposes no specific limitation on the fixed value of the reduction ratio LR with which the 12th velocity threshold SVth12 is replaced. The present invention may employ, for example, a value appropriately selected from 0.01 to 0.5.

Furthermore, the electrically powered suspension systems 11 according to the embodiments of the present invention have been described using an example where the values of the stroke velocity SV belonging to the 14th definition area SVB-14 are replaced with the fixed value "0.2" of the reduction ratio LR. However, the present invention is not limited to this example.

The present invention imposes no specific limitation on the fixed value of the reduction ratio LR with which the values of the stroke velocity SV belonging to the 14th definition area SVB-14 are replaced. The present invention may employ, for example, a value appropriately selected from 0.01 to 0.5.

Moreover, the electrically powered suspension systems 11 according to the embodiments of the present invention have been described using an example where the 13th velocity threshold SVth13 is replaced with the fixed value "0.2" of the reduction ratio LR. However, the present invention is not limited to this example.

The present invention imposes no specific limitation on the fixed value of the reduction ratio LR with which the 13th velocity threshold SVth13 is replaced. The present invention may employ, for example, a value appropriately selected from 0.01 to 0.5.

Moreover, the electrically powered suspension systems 11 according to the embodiments of the present invention have been described using an example where the four electromagnetic actuators 13 in total are arranged respectively in both the front wheels (the left front wheel and the right front wheel) and the rear wheels (the left rear wheel and the right rear wheel). However, the present invention is not limited to this example. The present invention may employ a configuration in which a total of two electromagnetic actuators 13 are arranged in either the front wheels or the rear wheels.

Finally, the electrically powered suspension systems 11 according to the embodiments of the present invention have been described referring to the drive controller 49 which controls the drives of the multiple electromagnetic actuators 13 independently of one another.

Specifically, the drive controller 49 may control the drives of the electromagnetic actuators 13 provided to the four wheels in a way that makes the controls in the respective wheels independent of one another.

Otherwise, the drive controller 49 may control the drives of the electromagnetic actuators 13 provided to the four wheels in a way that makes the controls in the front wheels and the controls in the rear wheels independent of each other, or in a way that makes the controls in the left wheels and the controls in the right wheels independent of each other.

What is claimed is:
1. An electrically powered suspension system comprising:
an electromagnetic actuator which is provided between a vehicle body and a wheel of a vehicle, and which includes an electric motor configured to generate drive forces for a damping operation and a telescopic operation;
an information acquirer which acquires information about a stroke velocity of the electromagnetic actuator;

a drive force arithmetic part which includes
  a damping force calculator configured to calculate a target damping force serving as a target value of the damping operation of the electromagnetic actuator, and
  a telescopic force calculator configured to calculate a target telescopic force serving as a target value of the telescopic operation of the electromagnetic actuator, and
  which obtains a target drive force based on the target damping force calculated by the damping force calculator and the target telescopic force calculated by the telescopic force calculator; and
  a drive controller which controls drive of the electric motor using the target drive force obtained by the drive force arithmetic part, wherein
the drive force arithmetic part includes an adjuster which performs an adjustment to reduce a telescopic control amount for the target telescopic force based on the stroke velocity acquired by the information acquirer, and
the adjuster included in the drive force arithmetic part performs an adjustment to increase a degree of reduction in the telescopic control amount corresponding to an increase in the stroke velocity acquired by the information acquirer.

2. The electrically powered suspension system according to claim 1, wherein
the adjuster included in the drive force arithmetic part performs an adjustment to hold the degree of reduction in the telescopic control amount when the stroke velocity exceeds a predetermined velocity threshold.

3. An electrically powered suspension system comprising:
an electromagnetic actuator which is provided between a vehicle body and a wheel of a vehicle, and which includes an electric motor configured to generate drive forces for a damping operation and a telescopic operation;
an information acquirer which acquires information about a stroke velocity of the electromagnetic actuator;
a drive force arithmetic part which includes
  a damping force calculator configured to calculate a target damping force serving as a target value of the damping operation of the electromagnetic actuator, and
  a telescopic force calculator configured to calculate a target telescopic force serving as a target value of the telescopic operation of the electromagnetic actuator, and
  which obtains a target drive force based on the target damping force calculated by the damping force calculator and the target telescopic force calculated by the telescopic force calculator; and
a drive controller which controls drive of the electric motor using the target drive force obtained by the drive force arithmetic part, wherein
the drive force arithmetic part includes an adjuster which performs an adjustment to reduce a telescopic control amount for the target telescopic force based on the stroke velocity acquired by the information acquirer, and
in the adjuster included in the drive force arithmetic part, a characteristic of a degree of reduction in the telescopic control amount during an increase in the stroke velocity and a characteristic of the degree of reduction in the telescopic control amount during a decrease in the stroke velocity are set to mutually-different modes.

4. An electrically powered suspension system comprising:
an electromagnetic actuator which is provided between a vehicle body and a wheel of a vehicle, and which includes an electric motor configured to generate drive forces for a damping operation and a telescopic operation;
an information acquirer which acquires information about a stroke velocity of the electromagnetic actuator;
a drive force arithmetic part which includes
  a damping force calculator configured to calculate a target damping force serving as a target value of the damping operation of the electromagnetic actuator, and
  a telescopic force calculator configured to calculate a target telescopic force serving as a target value of the telescopic operation of the electromagnetic actuator, and
  which obtains a target drive force based on the target damping force calculated by the damping force calculator and the target telescopic force calculated by the telescopic force calculator; and
a drive controller which controls drive of the electric motor using the target drive force obtained by the drive force arithmetic part, wherein
the drive force arithmetic part includes an adjuster which performs an adjustment to reduce a telescopic control amount for the target telescopic force based on the stroke velocity acquired by the information acquirer, and
in the adjuster included in the drive force arithmetic part, a response characteristic of an adjustment to increase a degree of reduction in the telescopic control amount and a response characteristic of an adjustment to decrease the degree of reduction in the telescopic control amount are set to mutually-different modes.

5. The electrically powered suspension system according to claim 4, wherein
in the adjuster included in the drive force arithmetic part, the response characteristic of the adjustment to decrease the degree of reduction in the telescopic control amount is set to be delayed in comparison with the response characteristic of the adjustment to increase the degree of reduction in the telescopic control amount with respect to time.

* * * * *